United States Patent
Oshima et al.

(10) Patent No.: US 8,032,987 B2
(45) Date of Patent: Oct. 11, 2011

(54) PORTABLE DEVICE AND HINGE ASSEMBLY

(75) Inventors: Kazuyoshi Oshima, Sanmu (JP);
Shinichirou Koshikawa, Yokaichiba (JP); Ryou Niimi, Togane (JP); Hisashi Fukai, Sanmu (JP); Manabu Hasegawa, Chiba (JP); Kenta Naganuma, Sanmu (JP)

(73) Assignees: Nintendo Co., Ltd., Kyoto (JP); PKM Corporation, Kyoto (JP); Sugatsune Kogyo Co., Ltd., Tokyo (JP)

( * ) Notice: Subject to any disclaimer, the term of this patent is extended or adjusted under 35 U.S.C. 154(b) by 483 days.

(21) Appl. No.: 12/067,640

(22) PCT Filed: Sep. 19, 2006

(86) PCT No.: PCT/JP2006/318533
§ 371 (c)(1),
(2), (4) Date: Mar. 20, 2008

(87) PCT Pub. No.: WO2007/034793
PCT Pub. Date: Mar. 29, 2007

(65) Prior Publication Data
US 2010/0146736 A1    Jun. 17, 2010

(30) Foreign Application Priority Data

Sep. 20, 2005 (JP) ................. 2005-272296

(51) Int. Cl.
*E05D 7/00* (2006.01)
(52) U.S. Cl. ............. 16/354; 16/355; 16/356; 16/366; 16/376
(58) Field of Classification Search .......... 16/354, 16/355, 356, 366, 376; 235/472.01; 348/333.06, 348/375–376; 361/379.55, 679.56, 679.26, 679.27, 679.3; 379/433.11–433.13, 433.01, 433.04; 455/575.1–575.9, 347–349, 351
See application file for complete search history.

(56) References Cited

U.S. PATENT DOCUMENTS
3,972,563 A * 8/1976 Gustafsson .............. 297/362
(Continued)

FOREIGN PATENT DOCUMENTS
CN    1610356 A    4/2005
(Continued)

OTHER PUBLICATIONS

International Search Report (English only) for PCT/JP2006/318533 mailed Dec. 19, 2006 (3 pages).
(Continued)

*Primary Examiner* — Victor Batson
*Assistant Examiner* — Roberta S Delisle
(74) *Attorney, Agent, or Firm* — Osha • Liang LLP

(57) ABSTRACT

One end portion of a connecting member 31 is connected to a first housing 1 such that the connecting member 31 is rotatable about a first rotation axis L1 fixed in position with respect to the first housing 1. The other end portion of the connecting member 31 is connected to a second housing 2 such that the connecting member 31 is rotatable about a second rotation axis L2 fixed in position with respect to the second housing 2 and extending parallel to the first rotation axis L1. The first housing 1 and the second housing 2 are located in different locations in a direction of the first and the second rotation axes L1, L2 such that a top surface 1a of the first housing 1 and an undersurface 2b of the second housing 2 are located generally on a same plane.

17 Claims, 31 Drawing Sheets

U.S. PATENT DOCUMENTS

| | | | |
|---|---|---|---|
| 5,363,089 A * | 11/1994 | Goldenberg | 340/7.63 |
| 5,485,517 A * | 1/1996 | Gray | 379/433.13 |
| 5,548,478 A * | 8/1996 | Kumar et al. | 361/679.27 |
| 5,987,704 A * | 11/1999 | Tang | 16/354 |
| 6,519,812 B2 * | 2/2003 | Ko et al. | 16/354 |
| 7,063,225 B2 * | 6/2006 | Fukuo | 220/264 |
| 7,483,723 B2 * | 1/2009 | Soderlund | 455/575.1 |
| 2003/0080131 A1 * | 5/2003 | Fukuo | 220/264 |
| 2004/0027793 A1 * | 2/2004 | Haraguchi et al. | 361/683 |
| 2004/0174452 A1 | 9/2004 | Kinemura et al. | |
| 2004/0174666 A1 * | 9/2004 | Brandenberg et al. | 361/680 |
| 2004/0224729 A1 * | 11/2004 | Watanabe et al. | 455/575.3 |
| 2005/0082372 A1 | 4/2005 | Lee et al. | |

FOREIGN PATENT DOCUMENTS

| | | |
|---|---|---|
| JP | 7-288860 | 10/1995 |
| JP | 2001-27931 A | 1/2001 |
| JP | 2004-179817 | 6/2004 |
| JP | 2004-266694 | 9/2004 |
| JP | 2007/034792 | 3/2007 |

OTHER PUBLICATIONS

Chinese Office Action for Application No. 2006800407825, mailed on Feb. 5, 2010 (5 pages).

English translation of Chinese Office Action for Application No. 2006800407825, mailed on Feb. 5, 2010 (6 pages).

Office Action for Japanese Patent Application No. 2010-107975 mailed Aug. 9, 2011, with English translation thereof (6 pages).

* cited by examiner

PORTABLE DEVICE AND HINGE ASSEMBLY

TECHNICAL FIELD

This invention relates to a portable device such as a portable game machine or a mobile phone handset and a hinge assembly suitable to be used in such a portable device.

BACKGROUND ART

In general, a mobile phone handset includes a first housing having an operation button, etc. disposed thereon, a second housing having a liquid crystal display, etc. disposed thereon, and a hinge assembly interposed between the first and the second housings. The hinge assembly includes a connecting member. One end portion of the connecting member is connected to the first housing such that the connecting member is rotatable about a first rotation axis. The other end portion of the connecting member is connected to the second housing such that the connecting member is rotatable about a second rotation axis parallel to the first rotation axis (see Patent Document 1).

Patent Document 1: Japanese Unexamined Patent Application Publication No. 2004-179817

DISCLOSURE OF THE INVENTION

Problem to be Solved by the Invention

In the mobile phone handset disclosed in the patent document 1 mentioned above, the first housing and the second housing are located in the same location in a direction of the first and the second rotation axes. In such an arrangement, when the first housing and the second housing are respectively rotated about the first and the second rotation axes, side surfaces of the first and the second housings abut each other. This makes it impossible for the first and the second housings to overlap each other in the direction of the first and the second rotation axes.

To address this problem, in the mobile phone handset mentioned above, the connecting member is divided into one end portion located on the first housing side and the other end portion located on the second housing side. The one end portion and the other end portion are connected to each other such that the one end portion and the other end portion are rotatable about a third rotation axis perpendicular to the first and the second rotation axes, thereby enabling the first and the second housings to overlap each other. However, in such an arrangement, the connecting member is divided into two pieces, and a hinge for connecting them is required. This results in increase in the number of component parts and assembly steps, thereby increasing the manufacturing cost of the mobile phone handset.

Means for Solving the Problem

In order to solve the above-mentioned problem, the present invention provides a portable device including a first housing; a second housing; and a hinge assembly rotatably connecting the first housing and the second housing, characterized in that the second housing is connected to the first housing by the hinge assembly such that the second housing can revolve about a first rotation axis, the first rotation axis fixed in position with respect to the first housing, and the second housing can rotate about a second rotation axis, the second rotation axis fixed in position with respect to the second housing and extending parallel to the first rotation axis, at least a portion of the first housing and a portion of the second housing being arranged such that the portion of the first housing and the portion of the second housing are in general contact with each other or spaced from each other in a direction of the first rotation axis and the second rotation axis so that at least the portion of the first housing and the portion of the second housing overlap each other in the direction of the first rotation axis and the second rotation axis.

Preferably, the hinge assembly includes a connecting member, one end portion of the connecting member being connected to the first housing such that the connecting member is rotatable about the first rotation axis, the other end portion of the connecting member being connected to the second housing such that the connecting member is rotatable about the second rotation axis.

Preferably, a receiving recess is formed in one of the portion of the first housing and the portion of the second housing overlapping each other in the direction of the first rotation axis and the second rotation axis, one side portion of the receiving recess in a direction perpendicular to the first rotation axis and the second rotation axis being open, the one end portion of the connecting member being received in the receiving recess such that the connecting member is rotatable about the first rotation axis, and the other end portion of the connecting member being received in the receiving recess such that the other end portion of the connecting member is movable in and out of the one side portion of the receiving recess that is open.

Preferably, a first receiving recess and a second receiving recess are respectively formed in the portion of the first housing and the portion of the second housing overlapping each other in the direction of the first rotation axis and the second rotation axis, one side portion of the first receiving recess in a direction perpendicular to the first rotation axis and the second rotation axis being open, one side portion of the second receiving recess in the direction perpendicular to the first rotation axis and the second rotation axis being open, the first receiving recess being able to receive the one side portion of the connecting member in the direction of the first rotation axis and the second rotation axis, the second receiving recess being able to receive the other side portion of the connecting member in the direction of the first rotation axis and the second rotation axis, the one end portion of the connecting member being received in the first receiving recess such that the connecting member is rotatable about the first rotation axis, the other end portion of the connecting member being received in the first receiving recess such that the other end portion of the connecting member is movable in and out of the one side portion of the first receiving recess, the other end portion of the connecting member being received in the second receiving recess such that the connecting member is rotatable about the second rotation axis, the one end portion of the connecting member being received in the second receiving recess such that the one end portion of the connecting member is movable in and out of the one side portion of the second receiving recess that is open.

Preferably, the hinge assembly includes a first gear portion and a second gear portion, the first gear portion non-rotatably disposed in the first housing such that an axis of the first gear portion coincides with the first rotation axis, the second gear portion non-rotatably disposed in the second housing such that an axis of the second gear portion coincides with the second rotation axis, the second gear portion meshing with the first gear portion.

Preferably, the hinge assembly further includes a support member, the support member being connected to the first gear portion such that the support member is rotatable about the first rotation axis, the support member being connected to the second gear portion such that the support member is rotatable about the second rotation axis, the support member being rotatable with respect to the first housing about the first rotation axis, the support member being rotatable with respect to the second housing about the second rotation axis.

Preferably, one of the first gear portion and the second gear portion is an internal gear portion and the other of the first gear portion and the second gear portion is an external gear portion, a fitting portion being provided in the support member, the fitting portion fitted to an inner peripheral surface of the internal gear portion such that the fitting portion is rotatable about an axis of the internal gear portion, a receiving portion being provided in the fitting portion, the receiving portion receiving the external gear portion such that the external gear portion is rotatable about the second rotation axis, one side portion of the receiving portion being open to outside of an outer peripheral surface of the fitting portion, one side portion of the external gear portion being protruded outside of the one side portion of the receiving portion that is open, the external gear portion being in mesh with the internal gear portion at the one side portion of the external gear portion that is protruded outside.

Preferably, when the second housing is rotated with respect to the first housing about the first rotation axis and the second rotation axis to a predetermined rotational position, the second housing is rotatable with respect to the first housing about a third rotation axis extending in a direction perpendicular to the first rotation axis and the second rotation axis.

A hinge assembly according to the present invention includes a first hinge member having a first attachment portion and a first gear portion; a second hinge member having a second attachment portion and a second gear portion, the second gear portion being in mesh with the first gear portion; and a support member, the support member supporting the first hinge member such that the first hinge member is rotatable about an axis of the first gear portion, the support member supporting the second hinge member such that the second hinge member is rotatable about an axis of the second gear portion, the support member maintaining the first gear portion and the second gear portion in mesh with each other, the axis of the first gear portion and the axis of the second gear portion being parallel with each other.

Preferably, the first gear portion is an internal gear portion and the second gear portion is an external gear portion.

Preferably, a fitting portion is provided in the support member, the fitting portion rotatably fitted in an inner peripheral surface of the first gear portion, a receiving portion being provided in the fitting portion, the receiving portion rotatably receiving the second gear portion, one side portion of the receiving portion being open to outside of an outer peripheral surface of the fitting portion, one side portion of the second gear portion being protruded outside of the one side portion of the receiving portion that is open, the second gear portion being in mesh with the first gear portion at the one side portion of the second gear portion that is protruded outside.

Preferably, the first hinge member includes a base part and a rotatable member, the base part having the first attachment portion disposed thereon, the rotatable member having the first gear portion disposed thereon, the rotatable member being connected to the base part such that the rotatable member is rotatable about an axis extending in a direction perpendicular to the axis of the first gear portion.

Preferably, both of the first gear portion and the second gear portion are external gear portions.

Preferably, the first gear portion and the second gear portion are disposed spaced from each other, an idler gear being disposed in the support member such that the idler gear is movable in a direction to increase or decrease a distance between the idler gear and the first and the second gear portions, the idler gear in mesh with the first gear portion and the second gear portion, the idler gear being biased to the direction to reduce the distance between the idler gear and the first and the second gear portions by biasing means, whereby the idler gear being made to be in mesh with the first gear portion and the second gear portion without backlash.

Effect of the Invention

According to the present invention having the above-described features, at least portions of the first and the second housings are located in substantial contact with each other or spaced from each other in the direction of the first and the second rotation axes. Thanks to this arrangement, when the first housing and the second housing are respectively rotated about the first and the second rotation axes to predetermined positions, at least the portions of the first and the second housings can overlap each other in the direction of the first and the second rotation axes.

DESCRIPTION OF REFERENCE NUMERALS

Figure 1:
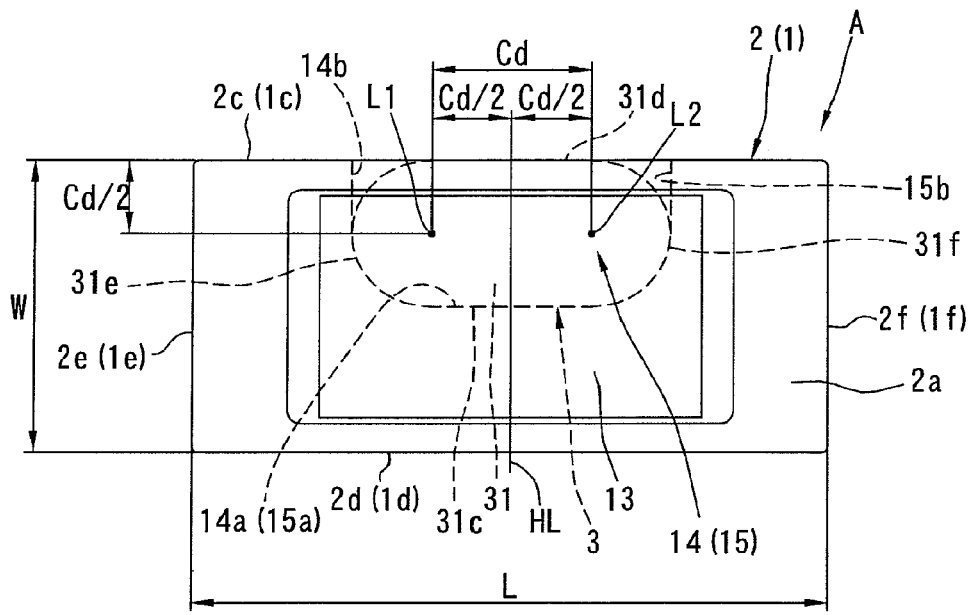
[FIG. 1] It is a plan view of a portable device according to a first embodiment of the present invention when a second housing is in an overlying position.

A game machine (portable device)
B game machine (portable device)
C game machine (portable device)
D game machine (portable device)
E game machine (portable device)
L1 first rotation axis
L2 second rotation axis
L3 third rotation axis
1 first housing
2 second housing
3 hinge assembly
4 hinge assembly
4A hinge assembly
4B hinge assembly
6 hinge assembly
9 hinge assembly
14 first receiving recess
15 second receiving recess
16 receiving recess
31 connecting member
41 first hinge member
41$a$ internal gear portion (first gear portion)
41$b$ attachment portion (first attachment portion)
42 first support member (support member)
42$b$ small-diameter portion (fitting portion)
42$c$ receiving recess (receiving portion)
43 second hinge member
43$a$ external gear portion (second gear portion)
43$b$ boss (second attachment portion)
44 second support member (support member)
61 base frame (base part)
61$a$ undersurface portion (first attachment portion)
62 rotatable member
63 shaft
64 gear
64$b$ external gear portion (first gear portion)
65 second hinge member
65$a$ attachment portion (second attachment portion)
65$b$ internal gear portion (second gear portion)
66A lower support member (support member)
66B upper support member (support member)
66$b$ short tubular portion (fitting portion)
91 first hinge member
91$a$ under portion (first attachment portion)
92 second hinge member
92$a$ top surface portion (second attachment portion)
93 support member
94 first external gear (first gear portion)
95 second external gear (second gear portion)
96 idler gear
98 spring member (biasing means)

BEST MODE FOR CARRYING OUT THE INVENTION

Preferred embodiments of the present invention will now be described with reference to the accompanying drawings.

FIGS. 1 through 10 show a first embodiment of the portable device according to the present invention. In this embodiment, the present invention is applied to a portable game machine (portable device) A. This invention can also be applied to other portable devices than the game machine, such as a mobile phone handset. The game machine A includes a first housing 1, a second housing 2 and a hinge assembly 3.

Figure 2:
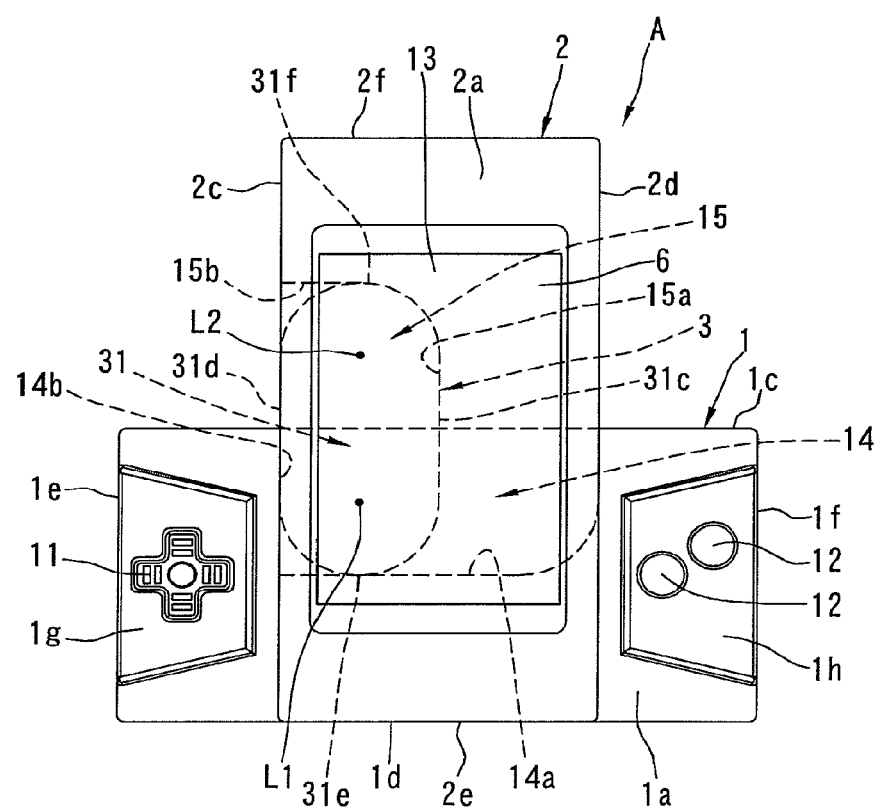
[FIG. 2] It is similar to FIG. 1, but for a condition when the second housing is in an intermediate position.
Figure 3:
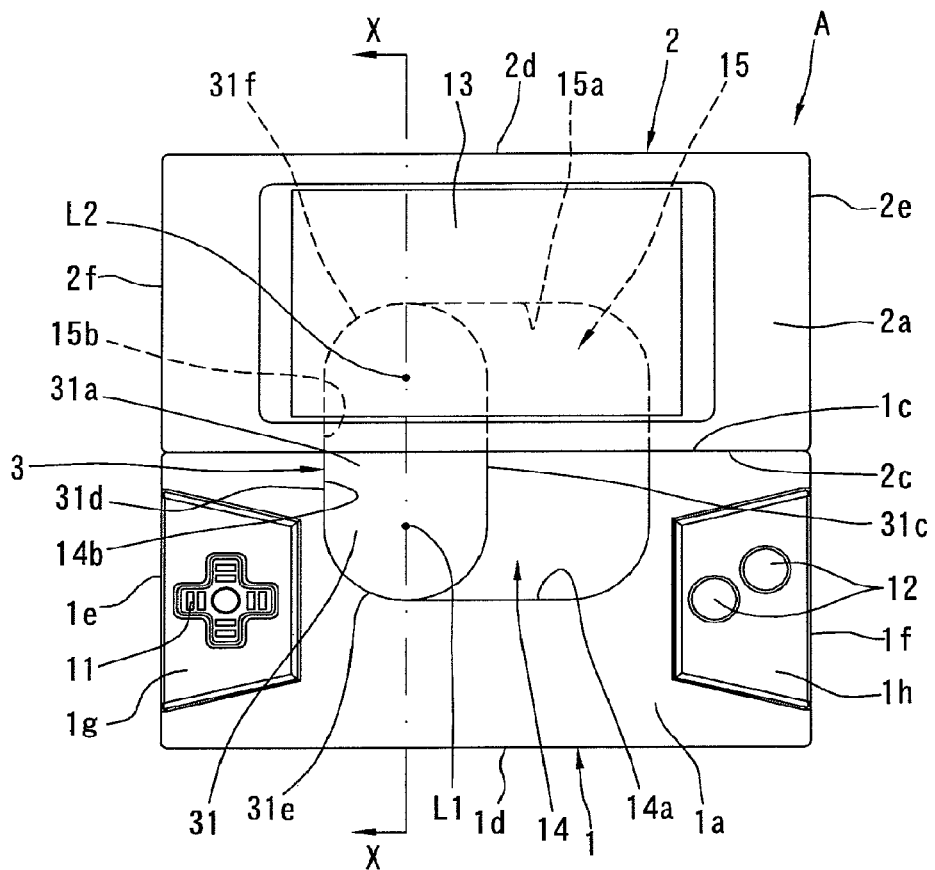
[FIG. 3] It is similar to FIG. 1, but for a condition when the second housing is in a deployed position.
Figure 4:
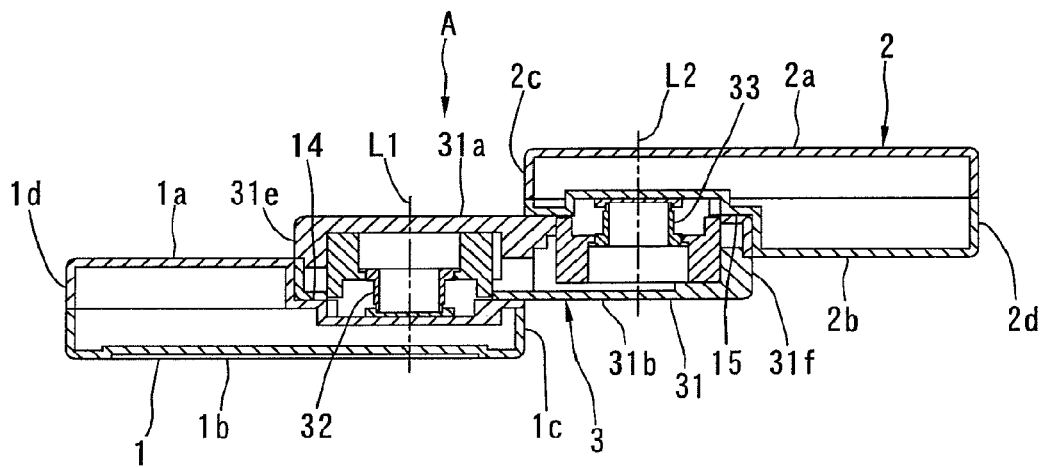
[FIG. 4] It is an enlarged cross-sectional view taken on line X-X of FIG. 3.

As most clearly shown in FIG. 4, the first housing 1 is formed into a thin and hollow rectangular parallelepiped configuration. The first housing 1 is positioned with its longitudinal direction in a right-left direction in FIGS. 1 to 3. For the sake of convenience of explanation, a thickness direction of the first housing 1 (vertical direction in FIG. 4) is referred to as a vertical direction, the longitudinal direction of the first housing 1 is referred to as a right-left direction and a short direction of the first housing 1 is referred to as a front-rear direction hereinafter.

A top surface (opposite surface with respect to the second housing 2) 1a and an undersurface 1b of the first housing 1 are horizontal planes. All of four side surfaces 1c, 1d, 1e, 1f of the first housing 1 are planes perpendicular to the top surface 1a and the undersurface 1b. Opposite end portions in the right-left direction (longitudinal direction) of the top surface 1a respectively have recesses 1g, 1h formed therein. An operation button 11 having a cross-like configuration is disposed on a bottom surface of one of the recesses 1g. A height of the operation button 11 is smaller than a depth of the recess 1g. Accordingly, a top surface of the operation button 11 is located lower than the top surface 1a of the first housing 1. Two push buttons 12 are disposed on a bottom surface of the other recess 1h. A height of the push button 12 is smaller than a depth of the recess 1h. Accordingly, top surfaces of the push buttons 12 are located lower than the top surface 1a.

The second housing 2 is formed into a thin and hollow rectangular parallelepiped configuration. In this embodiment, a shape and dimensions of the second housing 2 are the same as those of the first housing 1 in plan view. A top surface 2a and an undersurface (opposing surface facing the first housing 1) 2b of the second housing 2 are horizontal planes parallel to the top surface 1a and the undersurface 1b of the first housing 1. In other words, the second housing 2 is located parallel to the first housing 1. All of four side surfaces 2c, 2d, 2e, 2f of the second housing 2 are planes perpendicular to the top surface 2a and the undersurface 2b. A display 13 such as a liquid crystal display for displaying the game content is disposed on the top surface 2a of the second housing 2. The display 13 has a rectangular configuration in plan view. The display 13 is located in a central portion of the top surface 2a with its longitudinal direction aligned with a longitudinal direction of the second housing 2.

The hinge assembly 3 includes a connecting member 31. The connecting member 31 is formed as a flat plate having a relatively small thickness in the vertical direction. A top surface 31a and an undersurface 31b of the connecting member 31 are horizontal planes parallel to the top surface 1a and the undersurface 1b of the first housing 1 and the top surface 2a and the undersurface 2b of the second housing 2. In other words, the connecting member 31 is located parallel to the first housing 1 and the second housing 2. Side surfaces 31c, 31d along a longitudinal direction of the connecting member 31 are parallel to each other and perpendicular to the top surface 31a and the undersurface 31b. Side surfaces 31e, 31f disposed in opposite end portions in the longitudinal direction of the connecting member 31 are semicircular arcuate surfaces perpendicular to the top surface 31a and the undersurface 31b and positioned tangent to the side surfaces 31c, 31d.

As shown in FIG. 4, one end portion, i.e. an end portion on the side surface 31e side, of the connecting member 31 is rotatably connected to the first housing 1 through a shaft 32. An axis of the shaft 32 extends in the vertical direction. The axis of the shaft 32 is a first rotation axis L1. The other end portion, i.e. an end portion on the side surface 31f side, of the connecting member 31 is rotatably connected to the second housing 2 through a shaft 33. An axis of the shaft 33 extends in the vertical direction. The axis of the shaft 33 is a second rotation axis L2. The second rotation axis L2 is parallel to the first rotation axis L1.

Figure 7:
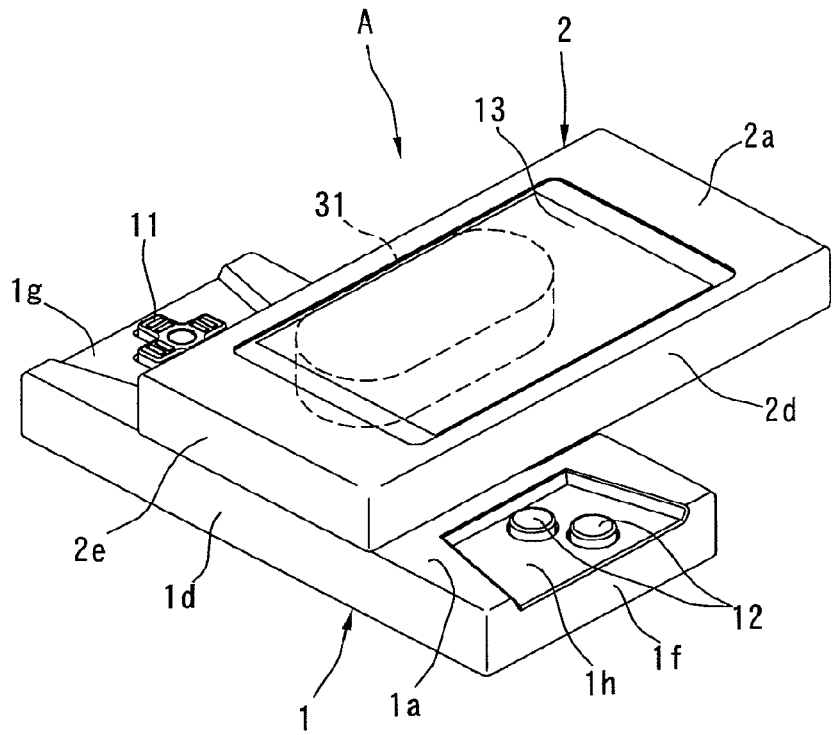
[FIG. 7] It is a perspective view of the portable device according to the first embodiment when the second housing is in the intermediate position.
Figure 8:
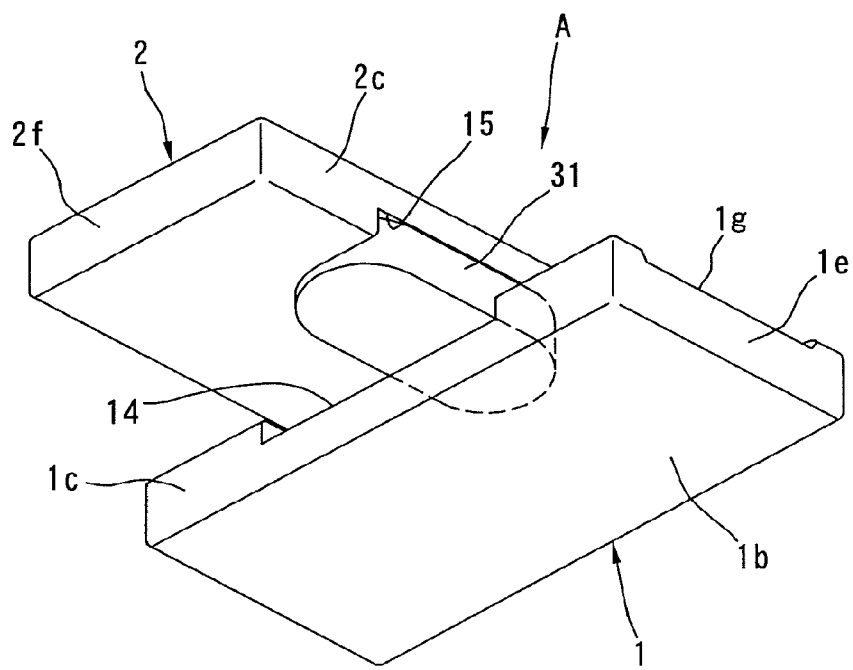
[FIG. 8] It is a perspective view of the portable device according to the first embodiment viewed from a different direction from FIG. 7.
Figure 9:
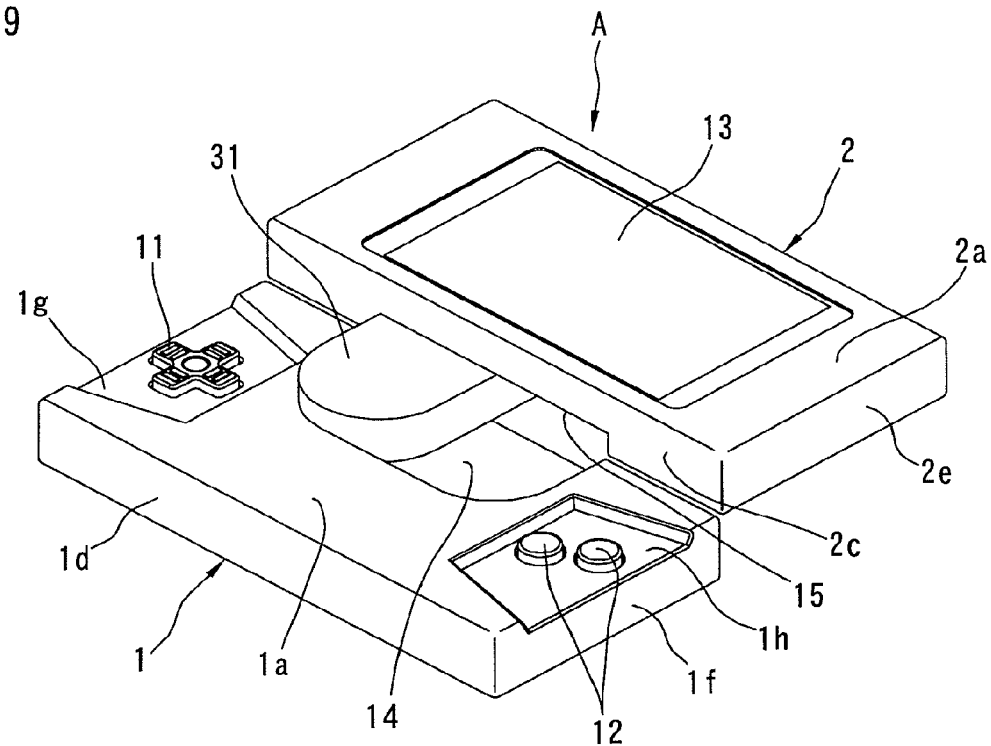
[FIG. 9] It is a perspective view of the portable device according to the first embodiment when the second housing is in the deployed position.
Figure 10:
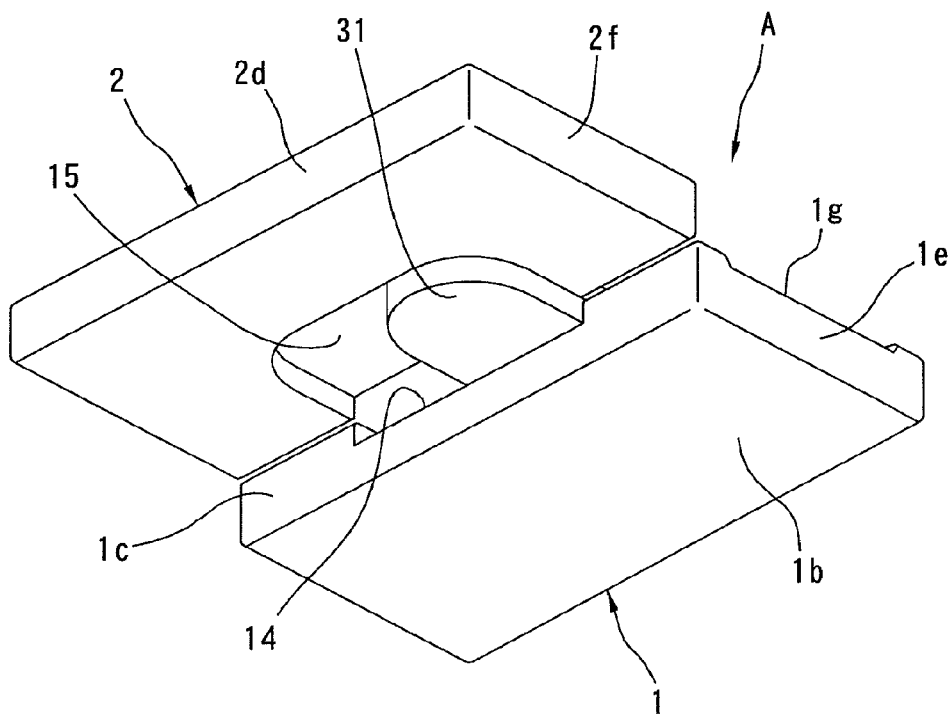
[FIG. 10] It is a perspective view of the portable device according to the first embodiment viewed from a different direction from FIG. 9.

The one end portion of the connecting member 31 is connected to the first housing 1 such that the connecting member 31 is rotatable about the first rotation axis L1 and the other end portion of the connecting member 31 is connected to the second housing 2 such that the connecting member 31 is rotatable about the second rotation axis L2. Accordingly, assuming that the first housing 1 is fixed in position, the second housing 2 revolves about the first rotation axis L1 with respect to the second housing 1 and rotates about the second rotation axis L2. The second housing 2 is rotatably displaceable between an overlying position as shown in FIGS. 1, 5 and 6 and a deployed position as shown in FIGS. 3, 9 and 10 via an intermediate position as shown in FIGS. 2, 7 and 8 by the revolution and the rotation.

Figure 5:
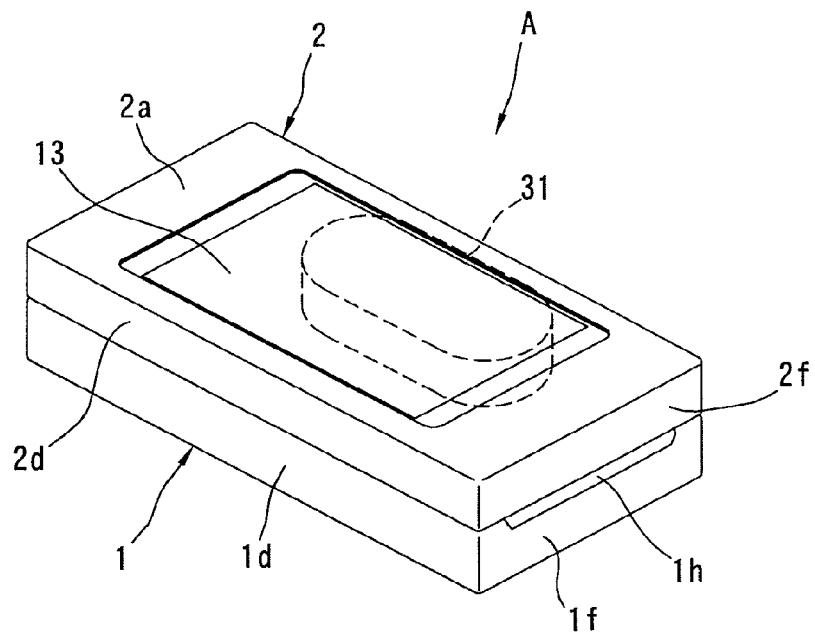
[FIG. 5] It is a perspective view of the portable device according to the first embodiment when the second housing is in the overlying position.
Figure 6:
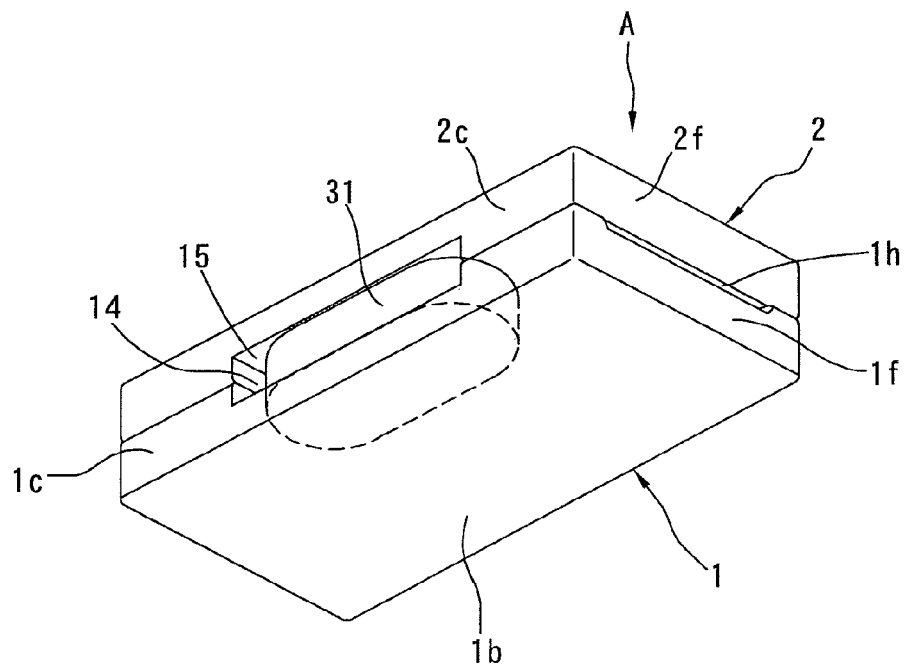
[FIG. 6] It is a perspective view of the portable device according to the first embodiment viewed from a different direction from FIG. 5.

When the second housing 2 is in the overlying position, as shown in FIGS. 1, 5 and 6, the first and the second housings 1, 2 are located in the same location in a horizontal direction and the entirety of the first and the second housings 1, 2 vertically overlap each other. Accordingly, when the game machine A is viewed from above with the second housing 2 in the overlying position, only the second housing 2 can be seen as if the overall dimensions of the game machine A were reduced. In this position, the game machine A can be easily carried in a bag, etc. Since the buttons 11, 12 are covered with the second housing 2, the buttons 11, 12 are prevented from being accidentally operated. Furthermore, since the top surfaces of the operation button 11 and the push buttons 12 are located below the top surface 1a of the first housing 1, the operation button 11 and the push buttons 12 do not interfere with the rotation of the second housing 2.

As shown in FIG. 1, when the first and the second housings 1, 2 are viewed from above with the second housing 2 in the overlying position, the first and the second rotation axes L1, L2 are arranged symmetrically with respect to a bisector HL bisecting the first housing 1 in the longitudinal direction. Particularly in this embodiment, the first and the second rotation axes L1, L2 are arranged such that when a distance between the first and the second rotation axes L1, L2 (hereinafter referred to as a center distance) is Cd, the first and the second rotation axes L1, L2 are spaced from the side surfaces 1c, 2c toward the side surfaces 1d, 2d of the first and the second housings 1, 2 by a distance of Cd/2, and spaced from the bisector HL in the right-left direction by a distance of Cd/2.

The connecting member 31 is arranged such that centers of curvature of the side surfaces 31e, 31f thereof having the semicircular arcuate configuration are respectively located on the first and the second rotation axes L1, L2. Radii of curvature of the side surfaces 31e, 31f are both Cd/2. A width of the connecting member 31 is the same as the center distance Cd. Accordingly, as shown in FIG. 1, when the second housing 2 is in the overlying position, the side surface 31d of the connecting member 31 is located in the same plane as the side surfaces 1c, 2c of the first and the second housings 1, 2.

When the second housing 2 is in the intermediate position, as shown in FIGS. 2, 7 and 8, the longitudinal direction of the first housing 1 and the longitudinal direction of the second housing 2 are perpendicular to each other, and the portion of the second housing 2 that is the left end portion when the second housing 2 is in the overlying position overlaps a central portion of the first housing 1 in the longitudinal direction of the first housing 1. The left side surface 2e of the second housing 2 is located in the same plane with the side surface 1d located in a front side and extending in the longitudinal direction of the first housing 1. As a result, when viewed form above, the first and the second housings 1, 2 exhibit a shape of an upside-down letter "T". When the second housing 2 is in the intermediate position, the first housing 1 and the second housing 2 vertically overlap each other with the side surface 1d of the first housing 1 and the side surface 2e of the second housing 2 located in the same plane (vertical plane). Therefore, when a length and a width of the first and the second housings 1, 2 are L and W, as clearly seen from FIG. 1, the following expression is satisfied:

$$L/2-Cd/2=W-Cd/2$$

$$\therefore L=2W$$

In other words, since the first and the second rotation axes L1, L2 are arranged as mentioned above and L=2W is satisfied, when the second housing 2 is in the intermediate position, an end portion of the second housing 2 on the side surface 2e side overlaps the central portion in the longitudinal direction of the first housing 1 with the side surface 2e of the second housing 2 located in the same plane as the side surface 1d of the first housing 1.

Since the length L and the width W of the first and the second housings 1, 2 satisfy L>W, when the second housing 2 is in the intermediate position, left and right end portions of the first housing 1 are respectively protruded from the second housing 2 in the left and the right directions, causing the recesses 1g, 1h respectively formed in the left and right end portions of the first housing 1 to be exposed from the second housing 2. As a result, the operation button 11 and the push buttons 12 disposed in the recesses 1g, 1h are exposed, and therefore freely accessible. Accordingly, when the second housing 2 is in the intermediate position, the game machine A can be operated. A user can enjoy the game machine A with the display 13 vertically positioned, i.e., with the longitudinal direction of the display 13 coinciding with the front-rear direction.

As shown in FIGS. 3, 9 and 10, the second housing 2 in the deployed position and the second housing 2 in the overlying position are symmetrical with respect to a point. To be more specific, the side surface 2c of the second housing 2 is located in the same plane (vertical plane) with the side surface 1c of the first housing 1. The side surface 2d and the side surface 1d are spaced from each other in the front-rear direction by the distance of 2W, which is a sum of the width of the first housing 1 and the width of the second housing 2. The side surfaces 2e, 2f are respectively located in the same plane with the side surfaces 1f, 1e.

In order to enable the second housing 2 to be rotationally displaced as described above, the game machine A further includes the following feature. Namely, the first and the second housings 1, 2 are arranged such that the top surface 1a of the first housing 1 and the undersurface 2b of the second housing 2 are located in the substantially same position in the vertical direction (direction of the first and the second rotation axes L1, L2) and, as a result, the top surface 1a and the undersurface 2b are generally in contact with each other. In other words, the second housing 2 is located higher than the first housing 1 by the thickness of the first housing 1. The first and the second housings 1, 2 may be arranged such that the undersurface 2b is slightly spaced upward from the top surface 1a. Since the undersurface 2b of the second housing 2 is generally in contact with or slightly spaced upward from the top surface 1a of the first housing 1, the second housing 2 can be rotated overlapping the first housing 1 in the vertical direction.

A first receiving recess 14 is formed in the top surface 1a of the first housing 1. The first receiving recess 14 is formed along the side surface 1c and is located in the central portion in the longitudinal direction of the first housing 1. A side portion of the first receiving recess 14 on the side surface 1c side is open to outside of the side surface 1c. A depth of the first receiving recess 14 is generally a half of the thickness of the connecting member 31. Therefore, the first receiving recess 14 can accommodate one side portion of the connecting member 31 in the thickness direction (direction of the first and the second rotation axes L1, L2).

The one end portion of the connecting member 31 is received in one end portion in the longitudinal direction (end portion on the side surface 1e side) of the first receiving recess 14 such that the one end portion of the connecting member 31 is rotatable about the first rotation axis L1. A rotation range of the connecting member 31 about the first rotation axis L1 is restricted between a first rotation position shown in FIG. 1 and a second rotation position shown in FIGS. 2 and 3.

As shown in FIG. 1, the first rotation position of the connecting member 31 is defined by the abutment of the side surface 31c of the connecting member 31 against a side surface 14a of the first receiving recess 14 extending parallel to the side surface 1c. When the connecting member 31 is in the first rotation position, the longitudinal direction of the connecting member 31 coincides with the longitudinal direction of the first housing 1 and the side surface 31d of the connecting member 31 is located in the same plane (vertical plane) with the side surface 1c of the first housing 1. Moreover, in plan view, the entirety of the connecting member 31 is received in the first receiving recess 14. However, it is only one of the side portions of the connecting member 31 in the direction of the first and the second rotation axes L1, L2 that is actually received in the first receiving recess 14 since the depth of the first receiving recess 14 is half the thickness of the connecting member 31 as mentioned above.

As shown in FIGS. 2 and 3, the second rotation position of the connecting member 31 is defined by the abutment of the side surface 31d of the connecting member 31 against a side surface 14b on the left side of the first receiving recess 14 perpendicular to the side surface 1c. When the connecting member 31 is rotated from the first rotation position through 90 degrees in a counter-clockwise direction in FIGS. 1 to 3 about the first rotation axis L1, the connecting member 31 is abutted against the side surface 14b. When the connecting member 31 is in the second position, the longitudinal direction of the connecting member 31 is perpendicular to the longitudinal direction of the first housing 1, and a half of the connecting member 31 on the other end side in the longitudinal direction (half on the second rotational axis L2 side) is protruded from the first receiving recess 14.

A second receiving recess 15 is formed in the undersurface 2b of the second housing 2. The second receiving recess 15 is formed along the side surface 2c and is located in a central portion in the longitudinal direction of the second housing 2. A side portion of the second receiving recess 15 on the side surface 2c side is open to outside of the side surface 2c. A depth of the second receiving recess 15 is generally a half of the thickness of the connecting member 31. Therefore, the second receiving recess 15 can accommodate the other side portion of the connecting member 31 protruded from the first receiving recess 14.

The other end portion of the connecting member 31 is received in an end portion (end portion on the side surface 2f side) of the second receiving recess 15 such that the other end portion of the connecting member 31 is rotatable about the second rotation axis L2. A rotation range of the second housing 2 with respect to the connecting member 31 is restricted between a third rotation position shown in FIGS. 1 and 2 and a fourth rotation position shown in FIG. 3.

As shown in FIGS. 1 and 2, the third rotation position of the second housing 2 is defined by the abutment of a side surface 15a of the second receiving recess 15 against a side surface 31c of the connecting member 31. The side surface 15a extends parallel to the side surface 2c of the second housing 2. When the second housing 2 is in the third rotation position, the longitudinal direction of the second housing 2 coincides with the longitudinal direction of the connecting member 31 and the side surface 2c of the second housing 2 is located in the same plane (vertical plane) with the side surface 31d of the connecting member 31. Moreover, in plan view, the entirety of the connecting member 31 is received in the second receiving recess 15. However, it is only the other side portion of the connecting member 31 in the direction of the first and the second rotation axes L1, L2 that is actually received in the second receiving recess 15 since the depth of the second receiving recess 15 is half the thickness of the connecting member 31.

As shown in FIG. 3, the fourth rotation position of the second housing 2 is defined by the abutment of a side surface 15b of the second receiving recess 15 perpendicular to the side surface 2c of the second housing 2 against the side surface 31d of the connecting member 31. When the second housing 2 is rotated from the third rotation position through 90 degrees in the counter-clockwise direction in FIGS. 1 to 3 about the second rotation axis L2, the second housing 2 is abutted against the side surface 31d. When the second housing 2 is in the fourth rotation position, the longitudinal direction of the second housing 2 is perpendicular to the longitudinal direction of the connecting member 31, and a half of the connecting member 31 in the longitudinal direction (half on the first rotational axis L1 side) is protruded from the second receiving recess 15.

In the game machine A having the above-described features, let us assume that the second housing 2 is in the overlying position. In this condition, the connecting member 31 is in the first rotation position with respect to the first housing 1 and the second housing 2 is in the third rotation position with respect to the connecting member 31. In other words, when the connecting member 31 is in the first rotation position with respect to the first housing 1 and in the third rotation position with respect to the second housing 2, the second housing 2 is in the overlying position with respect to the first housing 1.

When the connecting member 31 is rotated from the first rotation position through 90 degrees in the counter-clockwise direction in FIGS. 1 to 3 about the first rotation axis L1, the connecting member 31 reaches the second rotation position and stops there. At this time, the second housing 2 remains stationary with respect to the connecting member 31. But the second housing 2 revolves through 90 degrees about the first rotation axis L1 as the connecting member 31 rotates. In other words, when the connecting member 31 is rotated from the first rotation position to the second rotation position with the second housing 2 maintained in the third rotation position, the second housing 2 is positioned in the intermediate position.

When the second housing 2 in the intermediate position is rotated with respect to the connecting member 31 from the third rotation position through 90 degrees in the counter-clockwise direction of FIG. 2, i.e., when the second housing 2 is rotated through 90 degrees in the counter-clockwise direction about the second rotation axis L2, the second housing 2 reaches the fourth rotation position and stops there. At this time, the second housing 2 is in the deployed position. Therefore, the second housing 2 can be brought to the deployed position by bringing the connecting member 31 to the second rotation position and by bringing the second housing 2 to the fourth rotation position. The second housing 2 in the deployed position can be brought back to the overlying position by rotating the second housing 2 and the connecting member 31 in the clockwise direction in the reverse order from the above.

In the game machine A having the above-described features, the first and the second housings are located in different locations in the vertical direction (direction of the first and the second rotation axes L1, L2) such that the top surface 1a of the first housing 1 and the undersurface 2b of the second housing 2 are in substantial contact with each other or spaced from each other. Thanks to this arrangement, the first housing and the second housing can be made to be rotated overlapping each other simply by connecting the connecting member 31 to the first and the second housings 1, 2 such that the connecting member 31 is rotatable about the first and the second rotation axes L1, L2 without using any other hinge assembly. In this arrangement, the structure of the game machine A is simplified with reduced number of components, and thus the manufacturing cost of the game machine A can be reduced.

If the first and the second receiving recesses 14, 15 were not respectively formed in the first and the second housings 1, 2, it would be required to separate the top surface 1a and the undersurface 2b in the vertical direction (direction of the first and the second rotation axes L1, L2) by a distance equal to the thickness of the connecting member 31 to locate the connecting member 31 between the top surface 1a of the first housing 1 and the undersurface 2b of the second housing 2. However, in this embodiment, the one side portion and the other side portion of the connecting member 31 in the thickness direction thereof are respectively received in the first and the second receiving recesses 14, 15. Thanks to this arrangement, the top surface 1a of the first housing 1 and the undersurface 2b of the second housing 2 can be in substantial contact with each other without being spaced away from each other by the thickness of the connecting member 31. This contributes to the reduction of overall thickness of the game machine A.

In the above embodiment, the first and the second receiving recesses 14, 15 are respectively formed in the first and the second housings 1, 2, and the one side portion and the other side portion of the connecting member 31 in the thickness direction (direction of the first and the second rotation axes L1, L2) are respectively received in the first and the second receiving recesses 14, 15. However, a receiving recess having a thickness generally equal to the thickness of the connecting member 31 may be formed in either of the top surface 1a of the first housing 1 or the undersurface 2b of the second housing 2 so that the connecting member 31 is received in the receiving recess.

Figure 11:
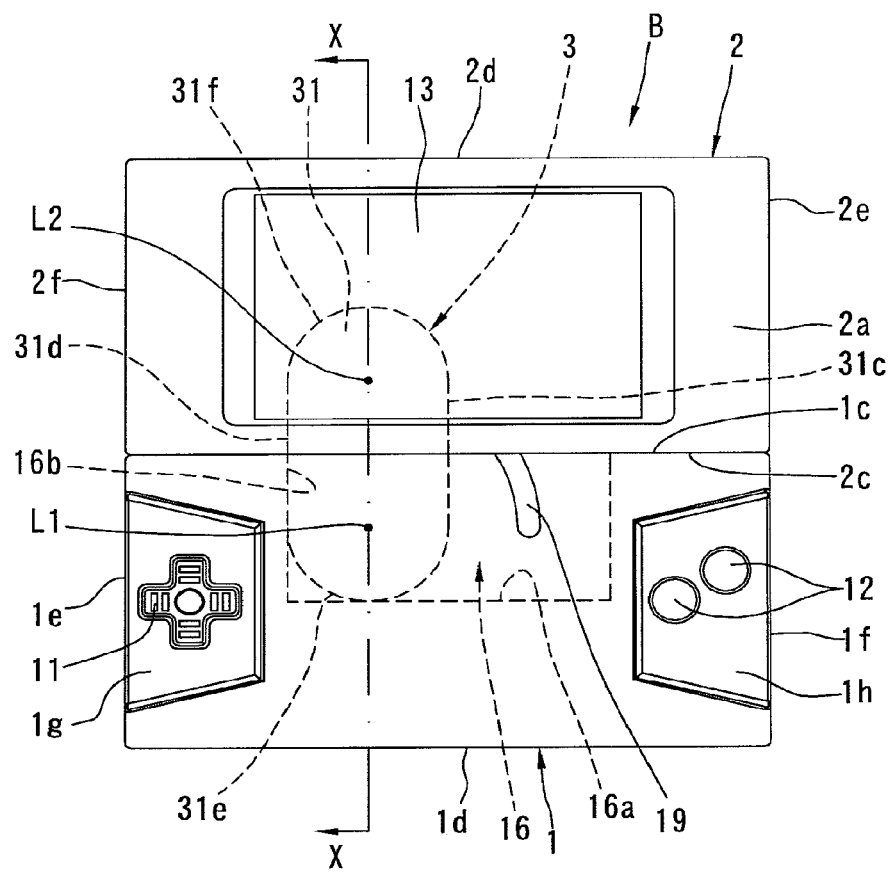
[FIG. 11] It is a plan view of the portable device according to a second embodiment of the present invention when the second housing is in the overlying position.
Figure 12:
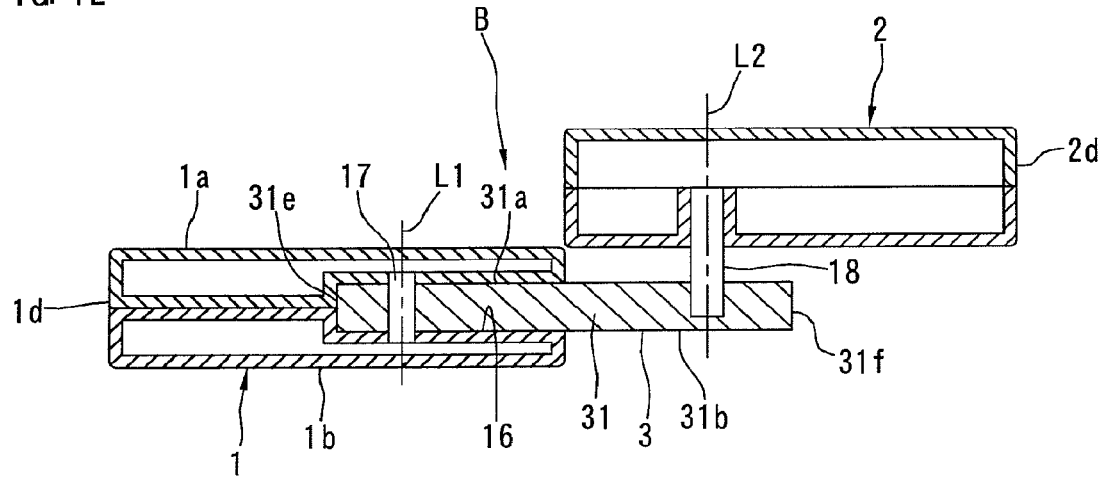
[FIG. 12] It is an enlarged cross-sectional view taken on line X-X of FIG. 11.

FIGS. 11 and 12 show a second embodiment of the portable device according to the present invention. In a game machine (portable device) B of this embodiment, a receiving recess 16 is formed in the first housing 1. In plan view, the receiving recess 16 has the same configuration and is located in the same location in the horizontal direction as the first receiving recess 14 of the first embodiment. However, the receiving recess 16 is located in a central portion of the side surface 1e of the first housing 1 and only one side portion of the receiving recess 16 is open to outside of the side surface 1c. Inner dimension in the vertical direction of the receiving recess 16 is generally the same as the external dimension of the connecting member 31. The one end portion of the connecting member 31 is received in a left end portion of the receiving recess 16 in the longitudinal direction. The one end portion of the connecting member 31 is rotatably connected to the first housing 1 via a shaft 17 coaxial with the first rotation axis L1. The other end portion of the connecting member 31 is retractably received in a right end portion of the receiving recess 16. A lower end portion of a shaft 18 coaxial with the second rotation axis L2 is disposed in the other end portion of the connecting member 31. An upper end portion of the shaft 18 protrudes upward from the connecting member 31 and is connected to the second housing 2. The shaft 18 is rotatably connected to at least one of the connecting member 31 and the second housing 2. The shaft 18 is non-rotatably connected to the connecting member 31 and rotatably connected to the second housing 2 in this embodiment.

A portion of the shaft 18 is located in the same location in the vertical direction as a portion of the first housing 1 located higher than the receiving recess 16. Therefore, without a guide groove 19 to be described later, when the second housing 2 is rotated from the deployed position as shown in FIG. 11 toward the intermediate position up to a predetermined position, the shaft 18 would be abutted against the side surface 1c of the first housing 1, restricting further movement of the second housing 2. To solve this problem, the game machine B has the guide groove 19 formed in the first housing 1. The guide groove 19 extends from the top surface 1a up to the receiving recess 16 in the vertical direction. In the front-rear direction, the guide groove 19 extends from the side surface 1e toward the side surface 1d along a circle about the first rotation axis L1 and having a radius of curvature equal to the center distance Cd. A width of the guide groove 19 is generally the same as or slightly greater than an outer diameter of the shaft 18. Therefore, when the second housing 2 is rotated from the deployed position toward the intermediate position about the second rotation axis L2 up to the predetermined position, the shaft 18 enters the guide groove 19. The guide groove 19 is long enough to accommodate the shaft 18 until the second housing 2 is rotated up to the intermediate position. Therefore, the second housing 2 can be rotated from the deployed position to up the intermediate position.

The first and the second rotation positions that are rotational limit positions of the connecting member 31 with respect to the first housing 1 are respectively defined by the abutment of the connecting member 31 against a side surface 16a and a side surface 16b of the receiving recess 16. The third and the fourth rotation positions that are rotational limit positions of the second housing 2 with respect to the connecting member 31 are respectively defined by a first and a second stopper portions (not shown) disposed between the second housing 2 and the shaft 18. Other arrangements are similar to the first embodiment.

Figure 13:
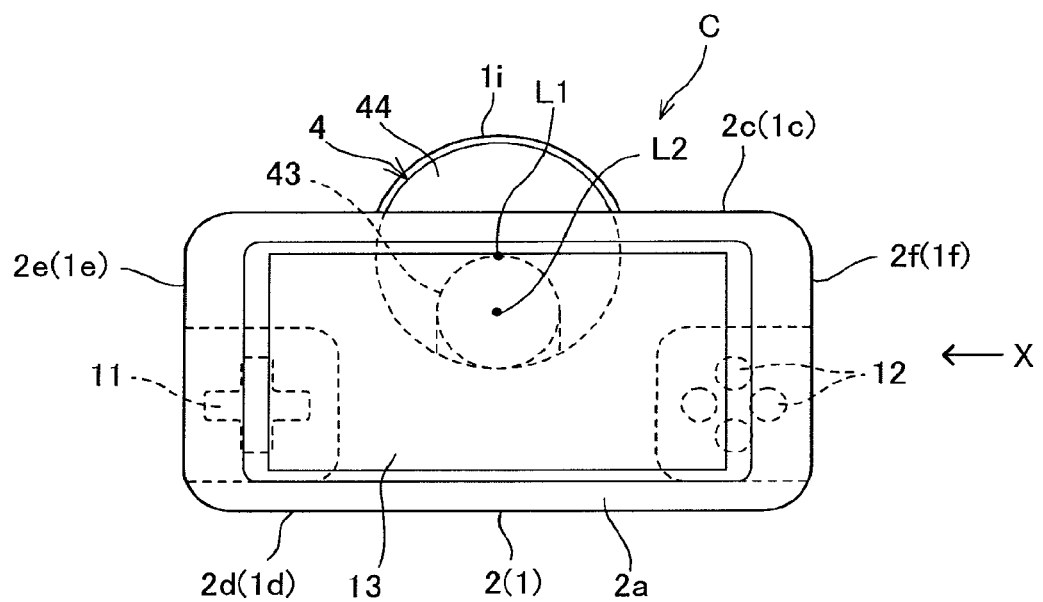
[FIG. 13] It is a plan view of the portable device according to a third embodiment of the present invention when the second housing is in the overlying position.
Figure 14:
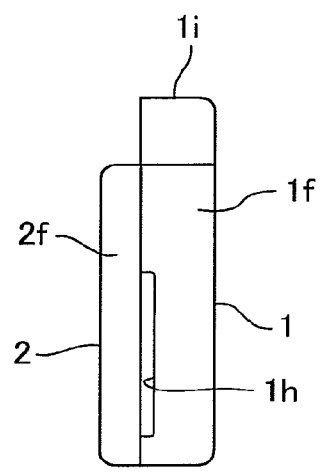
[FIG. 14] It is a view on arrow X of FIG. 13.
Figure 15:
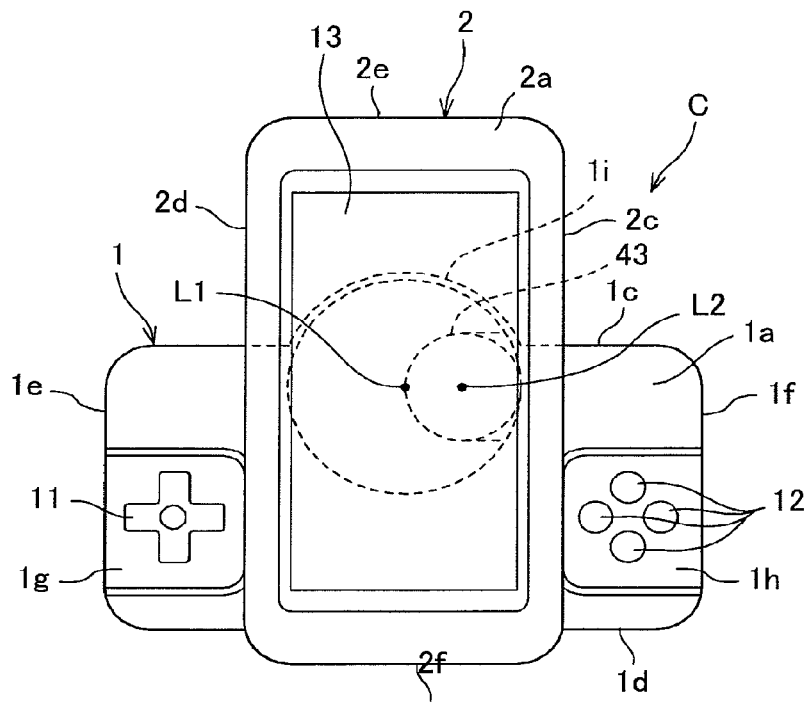
[FIG. 15] It is similar to FIG. 1, but for a condition when the second housing is in the intermediate position.
Figure 16:
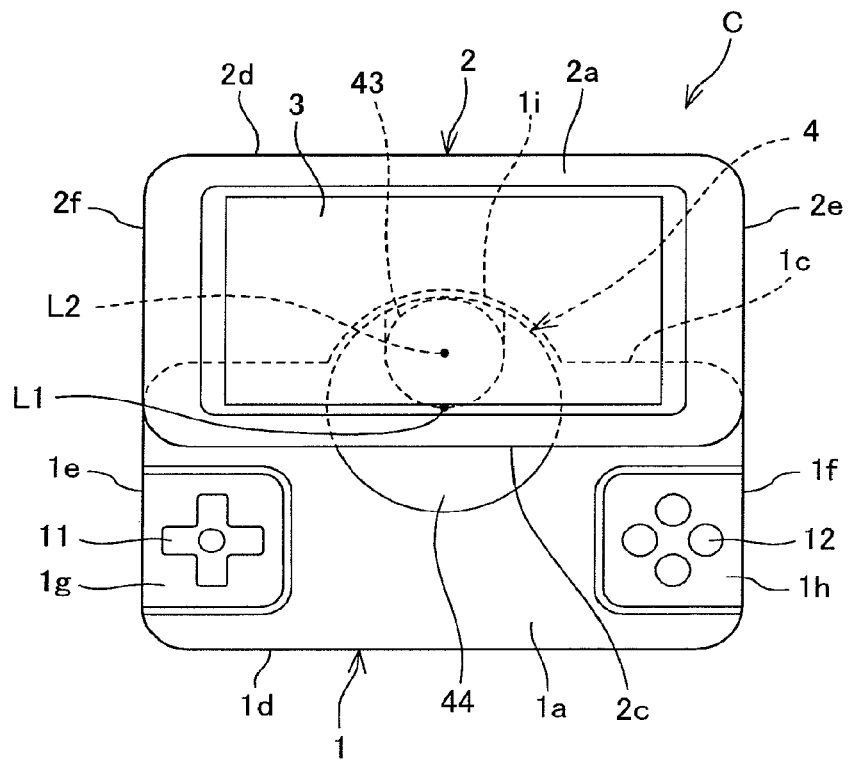
[FIG. 16] It is similar to FIG. 1, but for a condition when the second housing is in the deployed position.

FIGS. 13 to 22 show a third embodiment of the portable device according to the present invention. In a game machine (portable device) C of the third embodiment, a hinge assembly 4 is used in place of the hinge assembly 3. By the hinge assembly 4, the second housing 2 is connected to the first housing 1 such that the second housing 2 is rotatable between the overlying position as shown in FIG. 13 and the deployed position as shown in FIG. 16 via the intermediate position as shown in FIG. 15. The number of the push buttons 12 provided in this embodiment is four, but it may be two as with the above-mentioned embodiments.

To use the hinge assembly 4 in place of the hinge assembly 3, in the game machine C of this embodiment, as shown in FIGS. 13 to 17, a projecting portion 1i is formed in the side surface 1c of the first housing 1. The projecting portion 1i has a circular arcuate configuration in plan view. A center of curvature of an outer peripheral surface of the projecting portion 1i is located at a point in a center in the right-left direction (longitudinal direction) of the first housing 1 and spaced from the side surface 1c toward the side surface 1d by a predetermined distance. The distance between the center of curvature of the projecting portion 1i and the side surface 1c is smaller than the distance between the center of curvature and the center in the front-rear direction (short direction) of the first housing 1. In other words, the center of curvature of the projecting portion 1i is located closer to the side surface 1c than the central portion in the front-rear direction of the first housing 1. As described later, an axis extending through the center of curvature of the projecting portion 1i and perpendicular to the top surface 1a of the first housing 1 serves as the first rotation axis L1.

Figure 17:
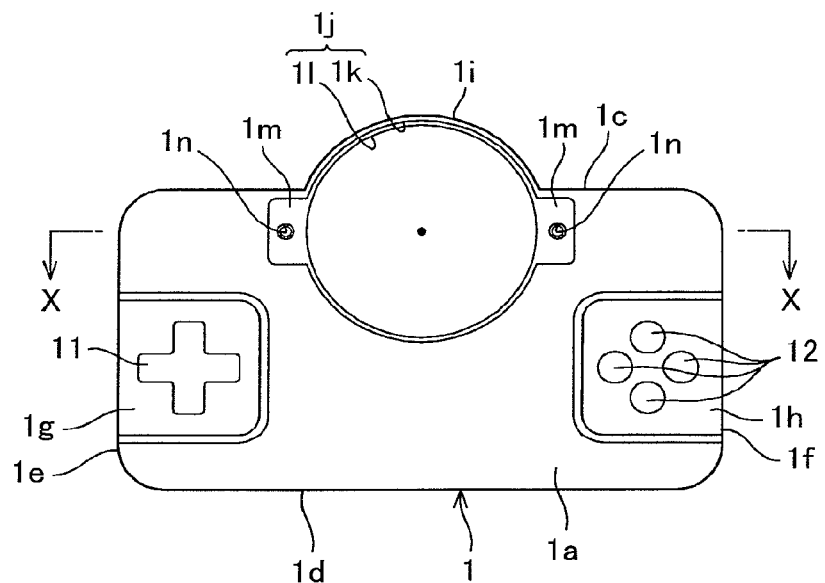
[FIG. 17] It is a plan view of a first housing used in the third embodiment.
Figure 18:
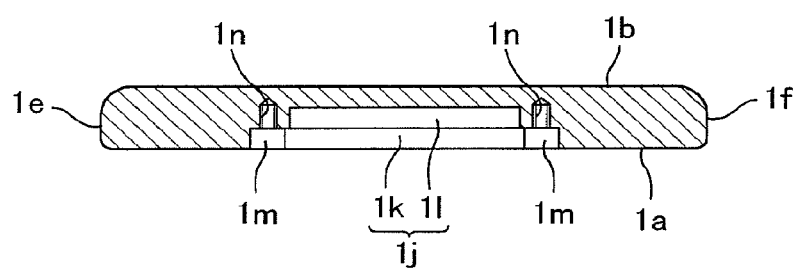
[FIG. 18] It is a cross-sectional view taken on line X-X of FIG. 17.

As shown in FIGS. 17 and 18, a receiving hole 1j having a circular cross section is formed in the top surface 1a of the first housing 1. The receiving hole 1j has a large diameter hole part 1k formed in the top surface 1a and a small diameter hole part 1l formed in a bottom surface of the large diameter hole part 1k. The large diameter hole part 1k and the small diameter hole part 1l are arranged such that axes of the large diameter hole part 1k and the small diameter hole part 1l coincide with the center of curvature of the projecting portion 1i, i.e., the first rotation axis L1. Positioning recesses 1m are formed in left and right side portions of the large diameter hole part 1k. The positioning recesses 1m have the same depth as the large diameter hole part 1k and communicate with the large diameter hole part 1k. An inner diameter of the small diameter hole part 1l is smaller than an inner diameter of the large diameter hole part 1k.

Figure 19:
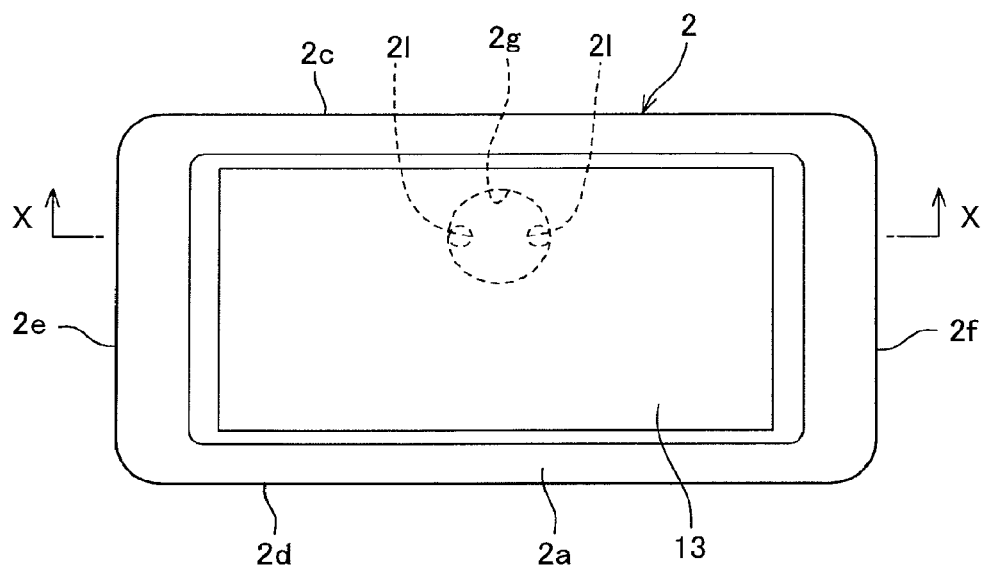
[FIG. 19] It is a plan view of the second housing used in the third embodiment.
Figure 20:
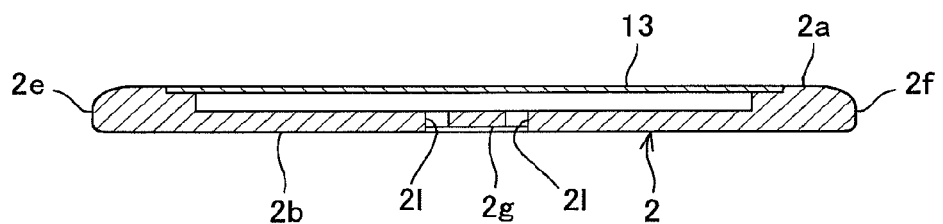
[FIG. 20] It is a cross-sectional view taken on line X-X of FIG. 19.

As shown in FIGS. 19 and 20, a positioning hole 2g having a small depth and a circular cross section is formed in the undersurface 2b of the second housing 2. A center of the positioning hole 2g is located at a point in a center in the longitudinal direction of the second housing 2 and spaced from the side surface 2c toward the side surface 2d by a predetermined distance. The distance between the center of the positioning hole 2g and the side surface 2c is the same as the distance between the receiving hole 1j and the side surface 1c. The center of the positioning hole 2g coincides with the second rotation axis L2.

Figure 21:
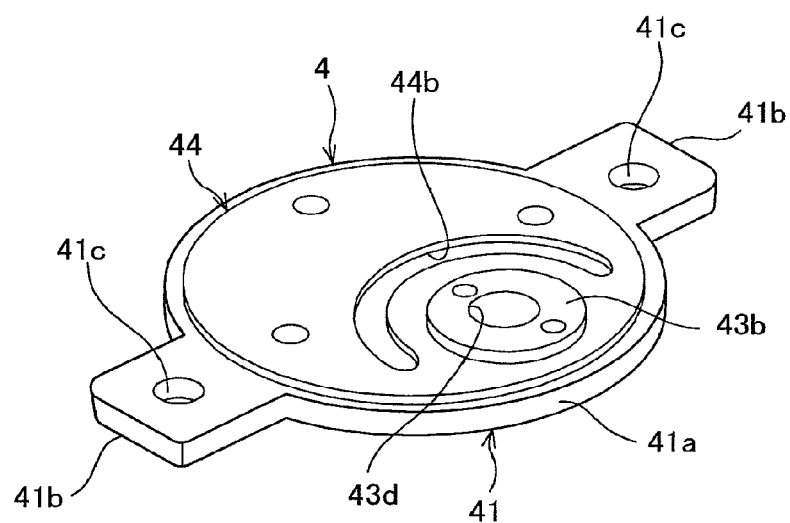
[FIG. 21] It is a perspective view of a hinge assembly used in the third embodiment.
Figure 22:
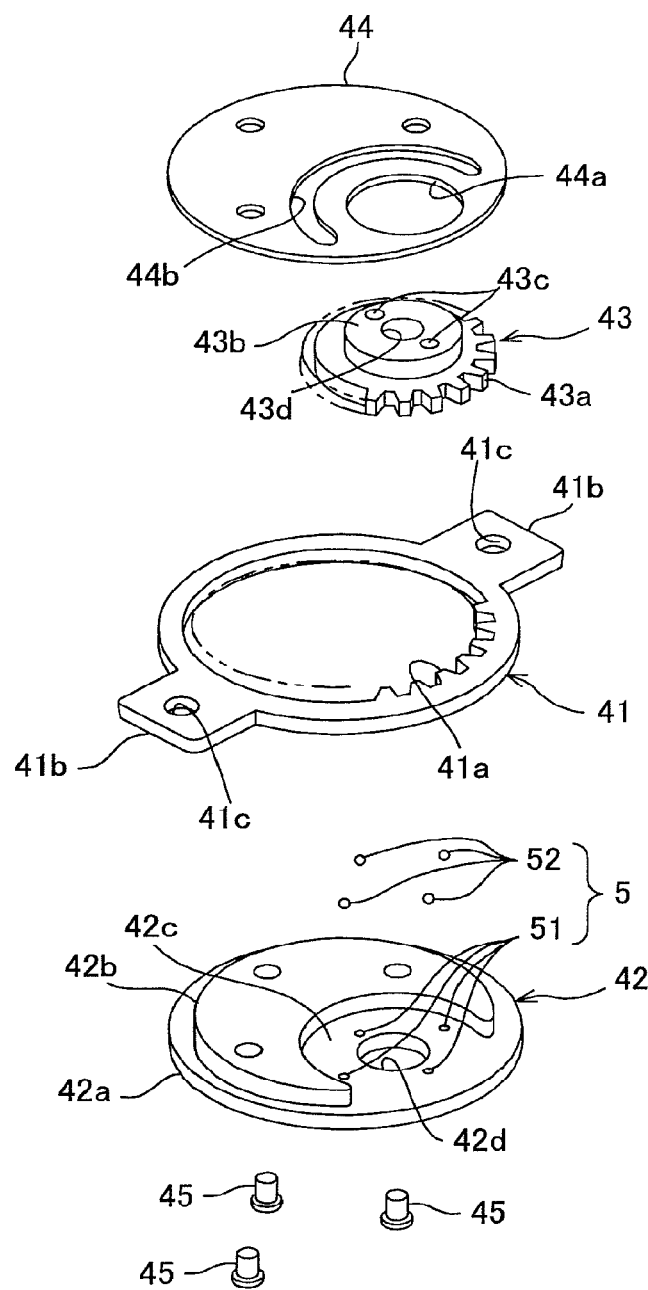
[FIG. 22] It is an exploded perspective view of the hinge assembly used in the third embodiment.

As shown in FIGS. 21 and 22, the hinge assembly 4 includes a first hinge member 41, a first support member (support member) 42, a second hinge member 43 and a second support member (support member) 44.

The first hinge member 41 is formed in a shape of a thin ring. An outer diameter of the first hinge member 41 is generally the same as the inner diameter of the large diameter hole part 1k. A thickness of the first hinge member 41 is generally the same as or slightly greater than the depth of the large diameter hole part 1k. An internal gear portion (first gear portion) 41a is formed in an inner peripheral surface of the first hinge member 41. A pair of attachment portions (first attachment portions) 41b, 41b are formed in an outer peripheral surface of the first hinge member 41 spaced from each other by 180 degrees in a circumferential direction. The first hinge member 41 is fitted in the large diameter hole part 1k with substantially no space therebetween, and the attachment portions 41b are fitted in the positioning recesses 1m, thereby positioning the first hinge member 41. Bolts (not shown) passing through insertion holes 41c of the attachment portions 41b are threaded into screw holes 1n (see FIG. 18) and tightened, thereby fixing the first hinge member 41 to the first housing 1. When the first hinge member 41 is fixed to the first housing 1, an axis of the first hinge member 41, that is the axis of the internal gear portion 41a coincides with the first rotation axis L1. Since the thickness of the first hinge member 41 is generally the same as or slightly greater than the depth of the large diameter hole part 1k, a top surface of the first hinge member 41 is located in generally the same plane with the top surface 1a of the first housing 1, or protruded slightly upward from the top surface 1a.

The first support member 42 is formed in a shape of a thin disc and has a large diameter portion 42a and a small diameter portion (fitting portion) 42b formed coaxially with each other. The large diameter portion 42a is rotatably fitted in the small diameter hole part 1l with substantially no space therebetween. Accordingly, the first support member 42 is rotatable with respect to the first housing 1 about the first rotation axis L1. A thickness of the large diameter portion 42a is generally the same as a depth of the small diameter hole part 1l. Accordingly, a top surface and an undersurface of the large diameter portion 42a are respectively abutted with a bottom surface of the small diameter hole part 1l and the first hinge member 41 with no space therebetween. As a result, the first support member 42 is held by the first housing 1 such that the first support member 42 is substantially non-movable in the direction of the first rotation axis L1.

An outer diameter of the small diameter portion 42b of the first support member 42 is generally the same as an inner diameter of the internal gear portion 41a of the first hinge member 41. The small diameter portion 42b of the first support member 42 is rotatably fitted in an inner peripheral surface of the internal gear portion 41a. A thickness of the small diameter portion 42b is generally the same as or slightly greater than the thickness of the first hinge member 41. Accordingly, a top surface of the small diameter portion 42b is located in generally the same plane with a top surface of the first hinge member 41, or protruded slightly upward from the top surface of the first hinge member 41. A receiving recess (receiving portion) 42c having a circular configuration is formed in the small diameter portion 42b. The receiving recess 42c is arranged such that an inner peripheral surface of the receiving recess 42c contacts an axis of the first support member 42. Moreover, an inner diameter of the receiving recess 42c is greater than a radius of the small diameter portion 42b. Therefore, one side portion on an outer side of the receiving recess 42c is open to outside from an outer peripheral surface of one side portion of the small diameter portion 42b. The inner diameter of the receiving recess 42c is generally the same as an outer diameter of an external gear portion 43a of the second hinge member 43 to be described later.

The second hinge member 43 has the external gear portion (second gear portion) 43a and a boss (second attachment portion) 43b formed coaxially with each other. The outer diameter of the external gear portion 43a is generally the same as the inner diameter of the receiving recess 42c. The external gear portion 43a is rotatably received in the receiving recess 42c. A portion on an outer peripheral side of the external gear portion 43a is protruded outward from an open portion of the receiving recess 42c. The protruded portion of the external gear portion 43a is in mesh with the internal gear portion 41a. Therefore, the second hinge member 43 revolves about the first rotation axis L1 and at the same time rotates about an axis of the second hinge member 43 (The axis coincides with the second rotation axis L2). When the second hinge member 43 revolves, the first support member 42, with the second hinge member 43 received in the receiving recess 42c thereof, rotates about the first rotation axis L1 together with the second hinge member 43. The number of teeth of the external gear portion 43a is half the number of teeth of the internal gear portion 41a. Accordingly, when a pitch circle diameter of the internal gear portion 41a that meshes with the external gear portion 43a is $D_C$, an axis of the external gear portion 43a is spaced from an axis of the internal gear portion 41a, i.e. the first rotation axis L1, by a distance of $D_C/2$. A thickness of the external gear portion 43a is generally the same as the thickness of the small diameter portion 42b of the first support member 42. Therefore, if the second hinge member 43 were directly contacted with a bottom surface of the receiving recess 42c, a top surface of the external gear portion 43a should be located in the same plane with the top surface of the small diameter portion 42b. However, as described later, the second hinge member 43 contacts the bottom surface of the receiving recess 42c via spherical bodies 52 to be described later. Therefore, the top surface of the external gear portion 43a is located higher than the top surface of the small diameter portion 42b. An outer diameter of the boss 43b is slightly smaller than a root circle diameter of the external gear portion 43a. A top surface of the boss 43b is protruded upward from the top surface of the first hinge member 41 by a predetermined distance.

The second support member 44 is formed as a thin disc and is arranged coaxially with the first support member 42. A holding hole 44a is formed in one side portion in a radial direction of the second support member 44. The boss 43b of the second hinge member 43 is rotatably inserted in the holding hole 44a. The other side portion in the radial direction of the second support member 44 is pressed onto the top surface of the small diameter portion 42b of the first support member 42, and is fixed to the first support member 42 by fixing members 45 such as rivets or metal eyelets. The one side portion in the radial direction of the second support member 44 is pressed onto the top surface of the external gear portion 43a. The first and the second support portions 42, 44 rotatably hold the external gear portion 43a by sandwiching the external gear portion 43a in the vertical direction. As a result, the internal gear portion 41a and the external gear portion 43a are maintained in constant mesh with each other by the first and the second support members 42, 44.

Since the top surface of the external gear portion 43a of the second hinge member 43 is protruded upward from the top surface of the small diameter portion 42b of the first support member 42, the one side portion of the second support member 44 fixed to the top surface of the small diameter portion 42b is in press contact with the top surface of the external gear portion 43a in an elastically deformed condition. Elastic force of the second support member 44 constantly biases the second hinge member 43 downward. In order to adjust a biasing force of the second support member 44 to proper level, an elongated hole 44b extending in a semi-circular configuration along the holding hole 44a is formed in a portion of the second support member 44 nearer to the other side portion than the holding hole 44a.

An upper end portion of the boss 43b protruded upward through the holding hole 44a is fitted in the positioning hole 2g of the second housing 2. This aligns the axis of the second hinge member 43 with the second rotation axis L2. The second housing 2 is fixed to the boss 43b by bolts (not shown) passing through insertion holes 2l (see FIGS. 19 and 20) of the second housing 2 and threaded into screw holes 43c of the boss 43b. As a result, the second housing 2 is connected to the first housing 1 such that the second housing 2 can revolve about the first rotation axis L1 and can rotate about the second rotation axis L2. The first and the second support members 42, 44 are rotatable with respect to the first and the second housings 1, 2 so that the first and the second support members 42, 44 do not interfere with rotation of the second housing 2 with respect to the first housing 1.

As mentioned above, the first rotation axis L1 is located in the center of the first housing 1 in the right-left direction (longitudinal direction of the first housing 1) and at a point offset toward the side surface 1c from the center of the first housing 1 in the front-rear direction (short direction of the first housing 1). The second rotation axis L2 is located in the center in the longitudinal direction of the second housing 2 and at a point spaced from the side surface 2c by a distance equal to a sum of a distance between the side surface 1c and the first rotation axis L1 and a center distance between the internal gear portion 41a and the external gear portion 43a. The first and the second rotation axes L1, L2 are arranged such that: when the second housing 2 is in the overlying position as shown in FIG. 13, the entirety of the second housing 2 vertically overlaps the entirety of the first housing 1 excluding the projecting portion 1i; when the second housing 2 is in the intermediate position as shown in FIG. 15, the second housing 2 is located at the center in the longitudinal direction of the first housing 1 such that the left and right end portions having the operation button 11 and the push buttons 12 disposed thereon are exposed outside; and when the second housing 2 is in the deployed position, the side portion of the first housing 1 on the side surface 1c side and the side portion of the second housing 2 on the side surface 2c side vertically overlap each other. An overlap width (width of overlap of the first and the second housings 1, 2 in the short direction) of the first and the second housings 1, 2 when the housing 2 is in the deployed position can be reduced by bringing the first rotation axis L1 closer to the side surface 1c or by bringing the second rotation axis L2 closer to the side surface 2c.

A through hole 43d vertically passing through the second hinge member 43 is formed in a central portion of the second hinge member 43. A through hole 42d is formed in the first support member 42 at a location opposing the through hole 43d. Wire harnesses (not shown) for connecting electronic components (the display 13, for example) received in the first and the second housings 1, 2 are respectively inserted in the through holes 43d, 42d.

A click mechanism 5 is provided between the first support member 42 and the second hinge member 43 so that the second housing 2 stops in position with clicking feel when the second housing 2 reaches the overlying position, the intermediate position and the deployed position. To be more specific, as shown in FIG. 22, four engagement recesses 51 having a generally semi-spherical configuration are formed in the bottom surface of the receiving recess 42c. The engagement recesses 51 are arranged on a circle about an axis of the receiving recess 42c (second rotation axis L2) spaced from each other by 90 degrees in a circumferential direction. On the other hand, four spherical bodies 52 are embedded in an undersurface of the second hinge member 43 with generally half of the spherical bodies 52 protruded downward. The undersurface of the second hinge member 43 opposes the bottom surface of the receiving recess 42c. The spherical bodies 52 are arranged on the same circle as the engagement recesses 51 and spaced from each other by 90 degrees in the circumferential direction. An outer diameter of the spherical body 52 is slightly greater than an inner diameter of the engagement recess 51. The spherical bodies 52 and the engagement recesses 51 are arranged such that when the second housing 2 reaches the overlying position, the four spherical bodies 52 and the four engagement recesses 51 are respectively located in the same location in the circumferential direction. Accordingly, when the second housing 2 reaches the overlying position, the intermediate position and the deployed position, the four spherical bodies 52 respectively fit in the four engagement recesses 51 and are abutted against peripheral portions of the engagement recesses 51 by the biasing force of the second support member 44. This causes the second hinge member 43 to be stopped with respect to the first support member 42 with a predetermined amount of force and with clicking feel. As a result, the second housing 2 fixed to the second hinge member 43 is stopped at the overlying position, the intermediate position and the deployed position with respect to the first housing 1 with a predetermined amount of force and with clicking feel.

When the spherical bodies 52 fit in and out of the engagement recesses 51 accompanying the rotation of the second hinge member 43, the second hinge member 43 is moved in the direction of the second rotation axis L2 by a distance equal to a distance the spherical bodies 52 move as they fit in and out of the engagement recesses 51. This causes the second housing 2 to be moved in the same direction. This movement of the second housing 2 can be avoided by, for example, forming the second support member 44 as a rigid body substantially non-elastically deformable and at the same time forming the first support member 42 to be elastically deformable.

First and second stopper mechanisms (both not shown) are provided between the first housing 1 and the second housing 2. When the second housing 2 rotating in the direction from the deployed position to the overlying position is rotated beyond the overlying position by a predetermined small angle (angle small enough not to cause the spherical bodies 52 to escape from the engagement recesses 51), further rotation of the second housing 2 in the same direction is restricted by the first stopper mechanism. When the second housing 2 rotating in the direction from the overlying position to the deployed position is rotated beyond the deployed position by a predetermined small angle (angle small enough not to cause the spherical bodies 52 to escape from the engagement recesses 51), further rotation of the second housing 2 in the same direction is restricted by the second stopper mechanism. In this manner, the rotation range of the second housing 2 is substantially restricted between the overlying position and the deployed position.

Figure 23:
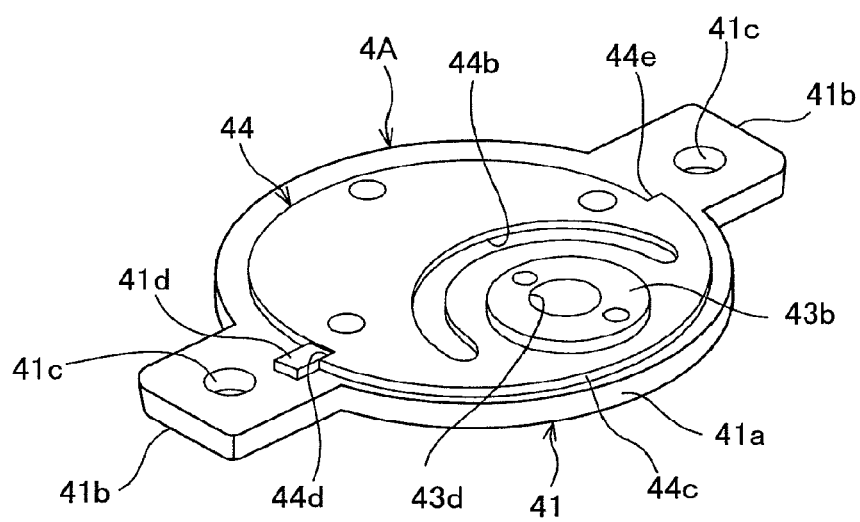
[FIG. 23] It is a perspective view of another example of the hinge assembly used in the portable device according to the present invention.
Figure 24:
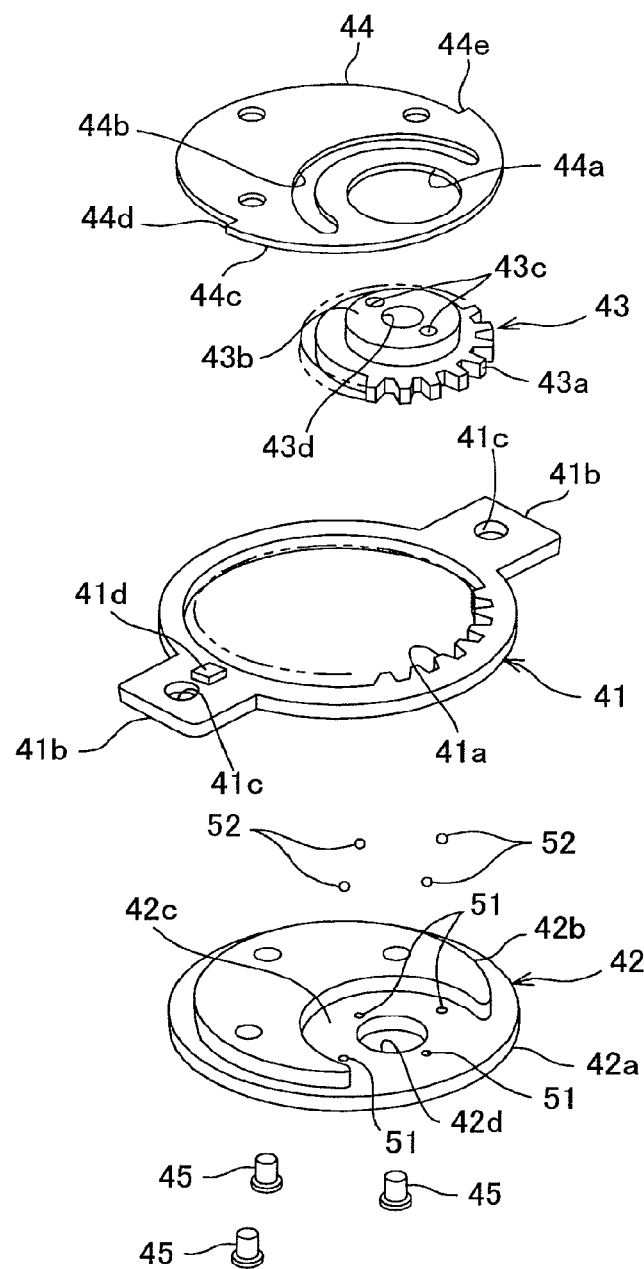
[FIG. 24] It is an exploded perspective view of the above-mentioned hinge assembly.

FIGS. 23 and 24 show a hinge assembly 4A, a variation of the hinge assembly 4. The hinge assembly 4A includes the function of the first and the second stopper mechanisms provided between the first housing 1 and the second housing 2 of the game machine C of the third embodiment. In order to realize the function of the stopper mechanisms in the hinge assembly 4A, a stopper projection 41d is provided in an outer periphery side on the top surface of the first hinge member 41 and an engagement protrusion 44c is formed in an outer peripheral surface of the second support member 44. The engagement protrusion 44c extends in a circumferential direction along slightly less than one half of the periphery of the second support member 44. When the second housing 2 rotating in the direction from the deployed position to the overlying position is rotated slightly beyond the overlying position, further rotation of the second housing 2 in the same direction is restricted by abutment of one end surface 44d in the circumferential direction of the engagement protrusion 44c against the stopper projection 41d. When the second housing 2 rotating in the direction from the overlying position to the deployed position is rotated slightly beyond the deployed position, further rotation of the second housing 2 in the same direction is restricted by abutment of the other end surface 44e in the circumferential direction of the engagement protrusion 44c against the stopper projection 41d. Except for the above features, the hinge assembly 4A is similar to the hinge assembly 4.

Figure 25:
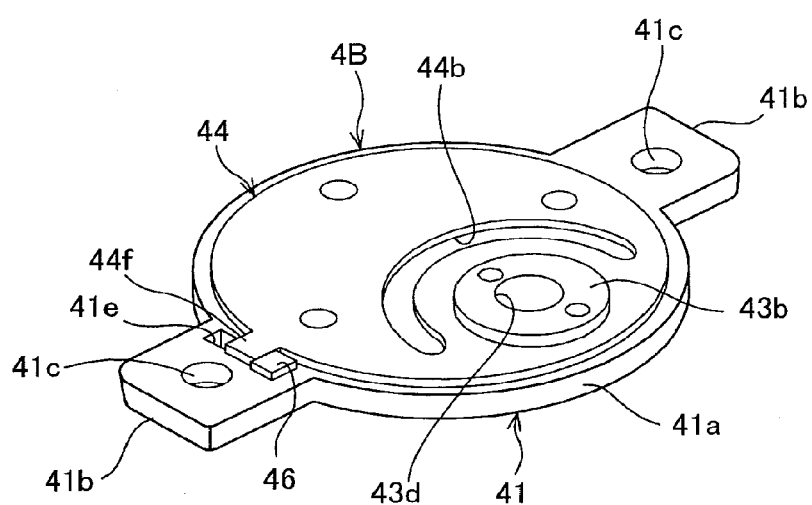
[FIG. 25] It is a perspective view of another example of the hinge assembly used in the portable device according to the present invention.
Figure 26:
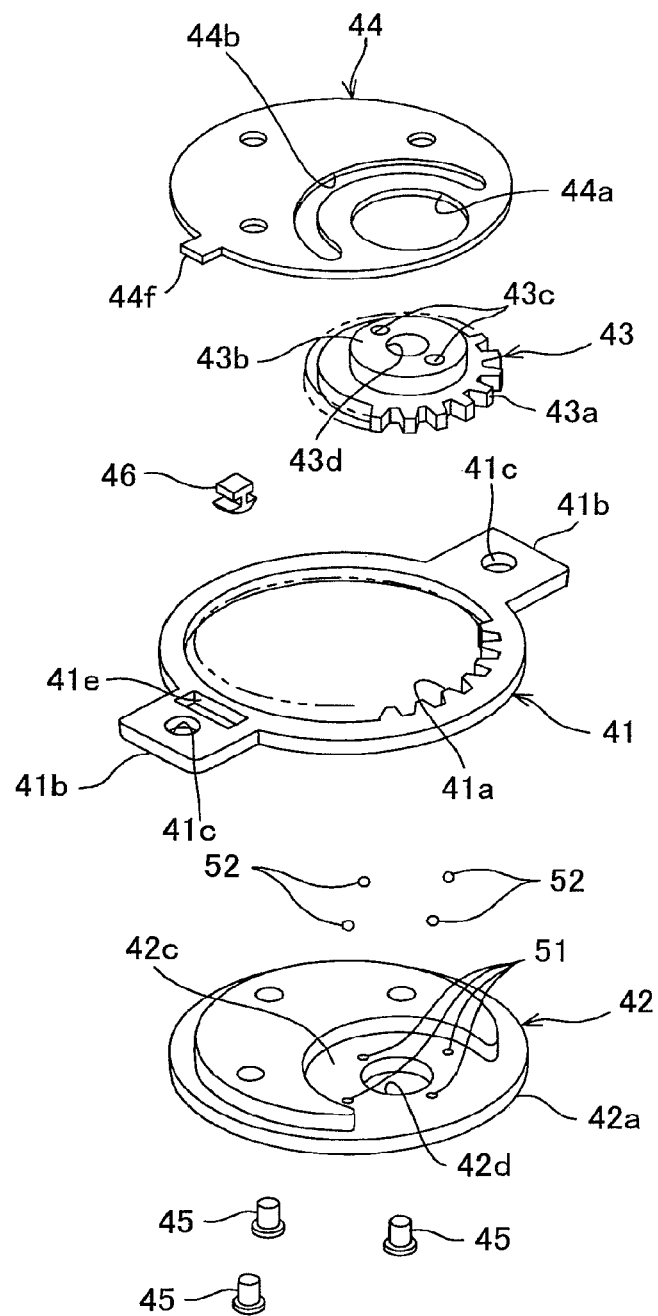
[FIG. 26] It is an exploded perspective view of the above-mentioned hinge assembly.

FIGS. 25 and 26 show a hinge assembly 4B, another variation of the hinge assembly 4. In the hinge assembly 4B, a rotation range of the second housing 2 with respect to the first housing 1 is restricted to 360 degrees with the overlying positions at both ends. To be more specific, a guide groove 41e extending in the circumferential direction or a tangential direction is formed in the top surface of the first hinge member 41 in the outer peripheral side. A lower end portion of a stopper member 46 is received in the guide groove 41e such that the stopper member 46 is movable in a longitudinal direction of the guide groove 41e. An engagement projection 44f is provided in the outer peripheral surface of the second support member 44. When the second housing 2 rotating in one direction reaches the vicinity of the overlying position, the engagement projection 44f is abutted against one end surface of the stopper member 46 and moves the stopper member 46 toward one end portion of the guide groove 41e. When the second housing 2 is rotated slightly beyond the overlying position, the stopper member 46 is abutted against one end surface in the longitudinal direction of the guide groove 41e. This restricts further rotation of the second housing 2 in the one direction. When the second housing 2 rotating in the other direction through almost 360 degrees from a position where its rotation in one direction is restricted to reach the vicinity of the overlying position, the engagement projection 44f is abutted against the other end surface of the stopper member 46 and moves the stopper member 46 toward the other end portion of the guide groove 41e. When the second housing 2 is rotated in the other direction slightly beyond the overlying position, the stopper member 46 is abutted against the other end surface of the guide groove 41e. This restricts further rotation of the second housing 2 in the other direction. As a result, the rotation range of the second housing 2 is substantially restricted to 360 degrees with the overlying positions at both ends.

Figure 27:
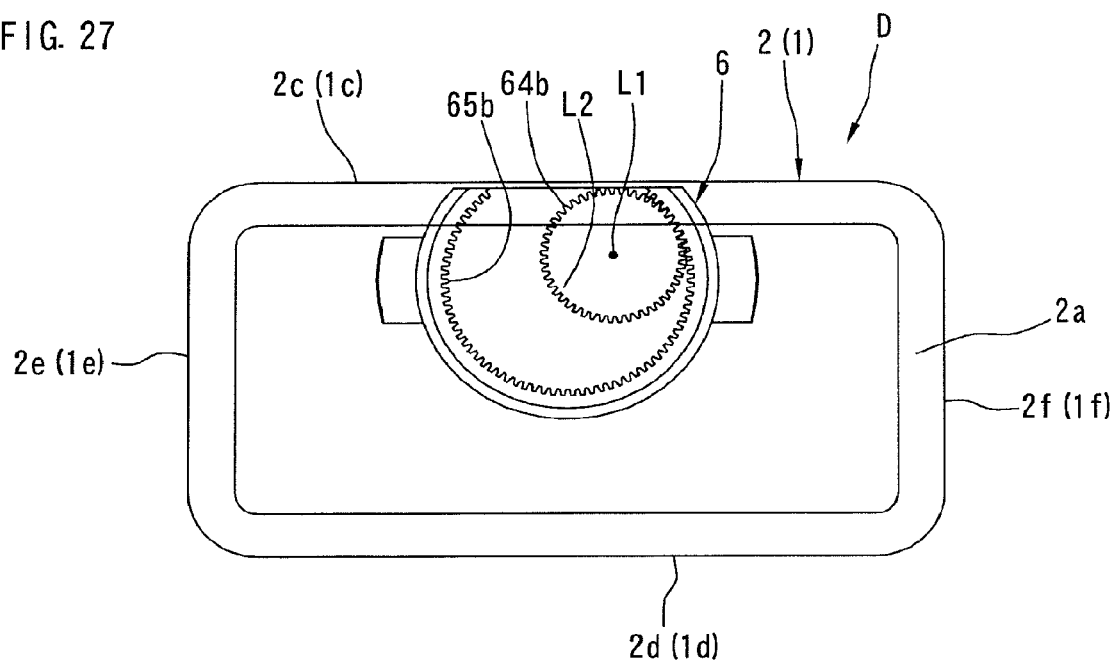
[FIG. 27] It is a partially transparent plan view of the portable device according to a fourth embodiment of the present embodiment when the second housing is in the overlying position.
Figure 28:
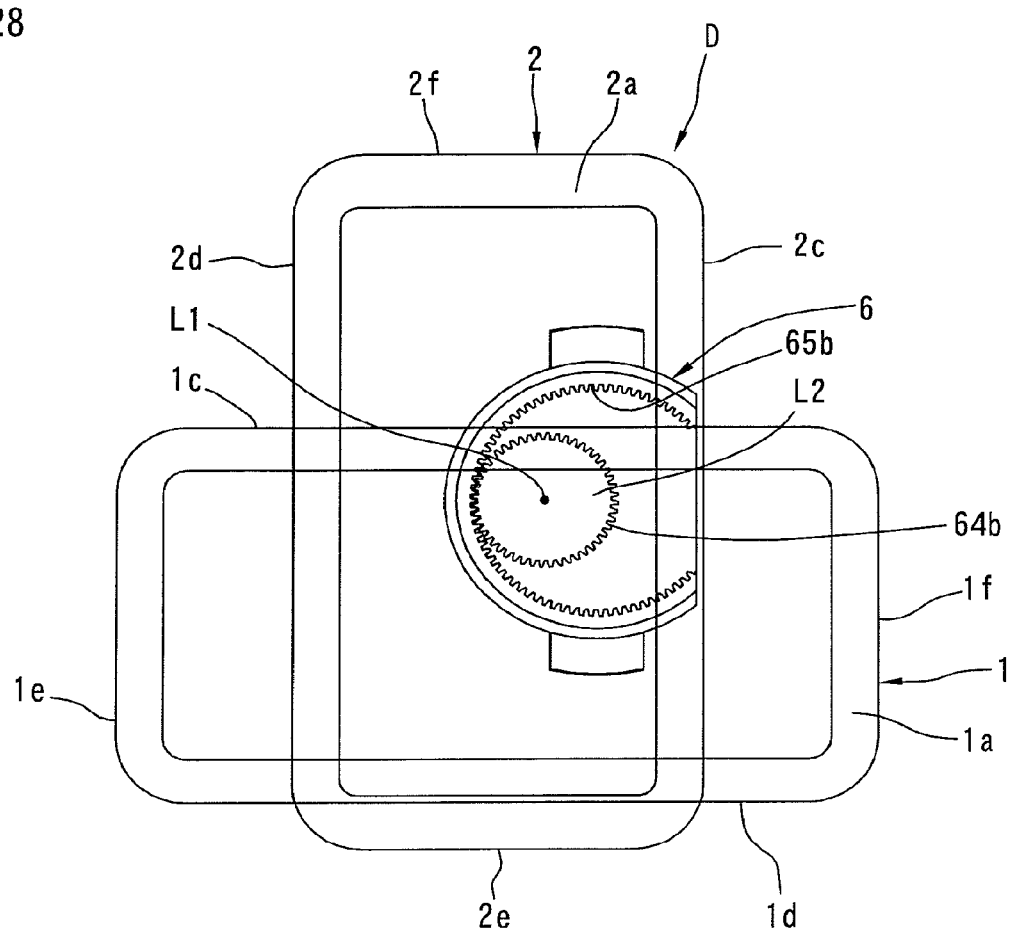
[FIG. 28] It is similar to FIG. 27, but for a condition when the second housing is in the intermediate position.
Figure 29:
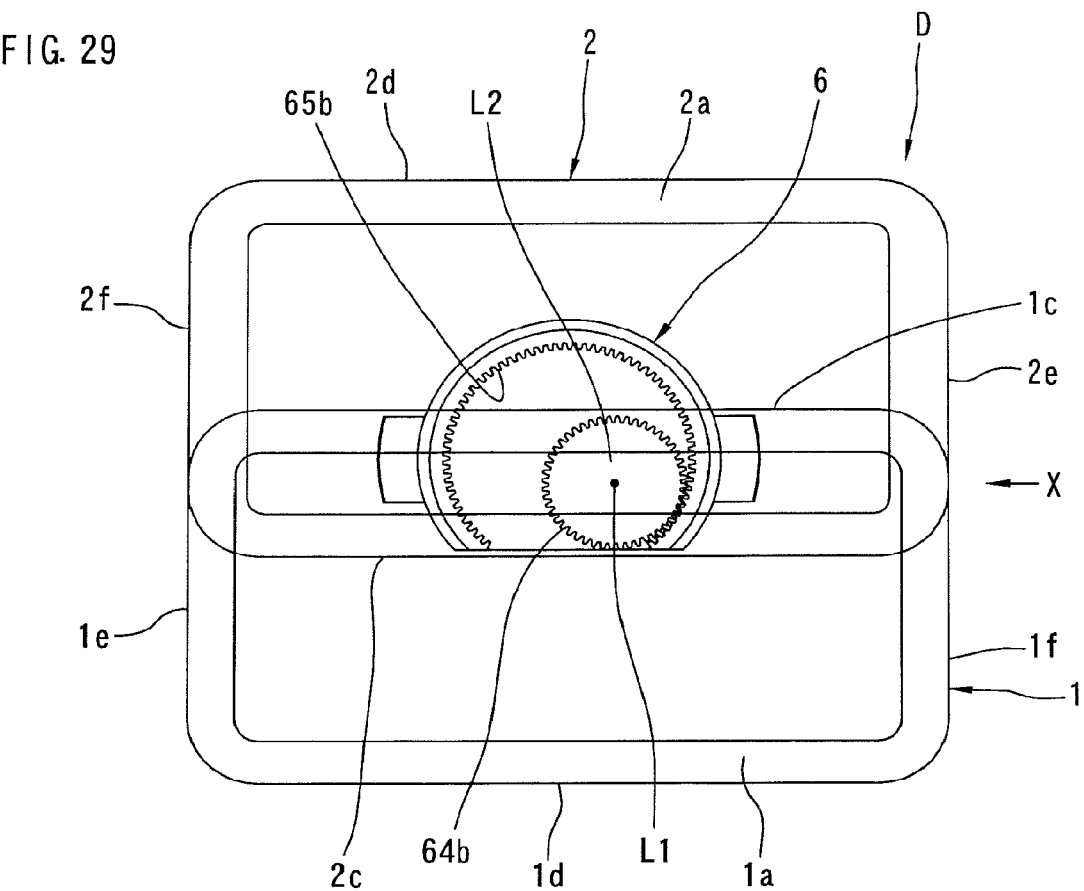
[FIG. 29] It is similar to FIG. 27, but for a condition when the second housing is in the deployed position.
Figure 30:
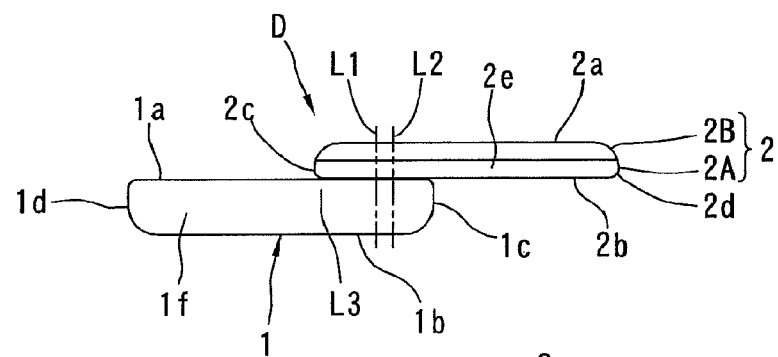
[FIG. 30] It is a view on arrow X of FIG. 29.
Figure 31:
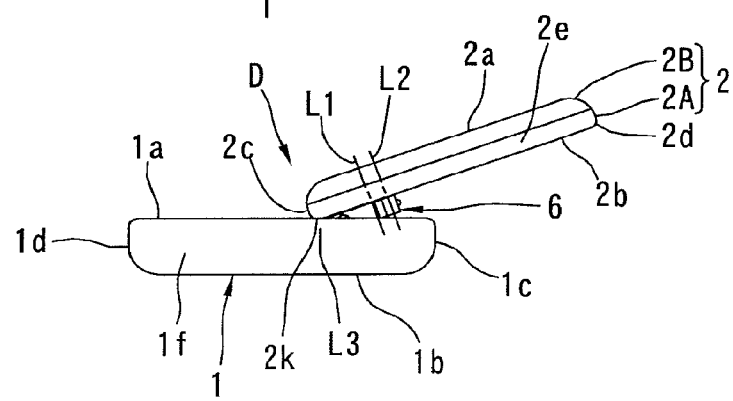
[FIG. 31] It is similar to figure with FIG. 30, but for a condition when the second housing is in an inclined position.

FIGS. 27 to 41 show a fourth embodiment of the portable device according to the present invention. As shown in FIGS. 27 to 29, in a game machine (portable device) D of the fourth embodiment, the second housing 2 is rotatable with respect to the first housing 1 between the overlying position and the deployed position via the intermediate position. The game machine D shares this feature with the game machines A to C described above. What is unique about the game machine D is that the use of a hinge assembly 6 eliminates the necessity of forming the projecting portion 1i in the first housing 1. Moreover, when in the deployed position, the second housing 2 is rotatable about a third rotation axis between a parallel position as shown in FIG. 30 and an inclined position as shown in FIG. 31. The third rotation axis extends perpendicular to the first and the second rotation axes L1, L2 and parallel to the side surface 1c of the first housing 1. The second housing 2 is restricted in the parallel position by the abutment of the undersurface 2b of the second housing 2 against the top surface 1a of the first housing 1. The second housing 2 is restricted in the inclined position by the abutment of an inclined surface 2k formed in an intersecting portion of the undersurface 2b and the side surface 2c of the second housing 2 against the top surface 1a of the first housing 1. Except when in the deployed position, the second housing 2 is not rotatable about the third rotation axis L3 because the undersurface 2b of the second housing 2 is generally in contact with the top surface 1a of the first housing 1. It is easier to see the display (see FIG. 31) when the second housing 2 is in the inclined position compared with when the second housing 2 is in the parallel position.

Figure 32:
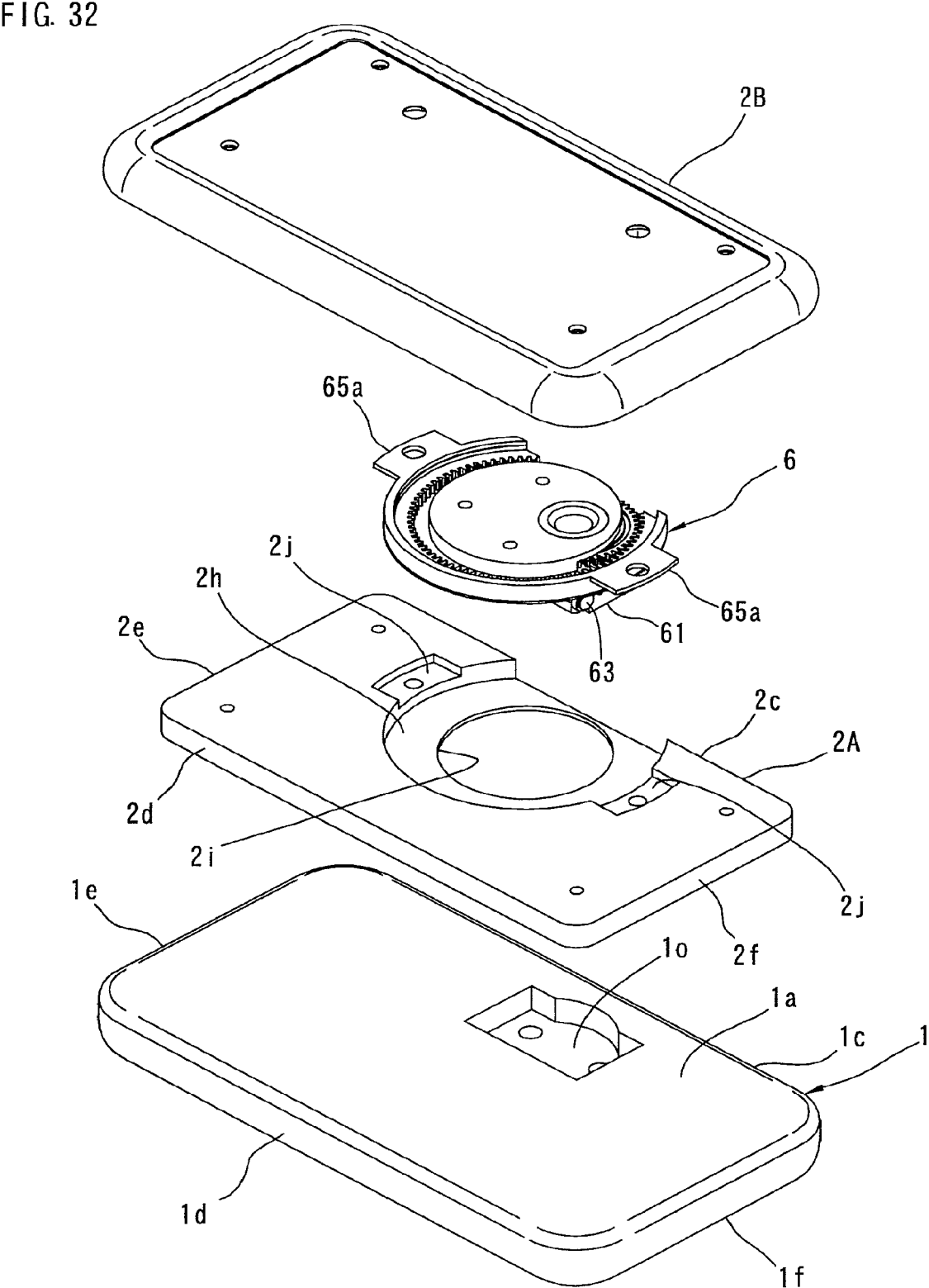
[FIG. 32] It is an exploded perspective view of the portable device according to the fourth embodiment.
Figure 33:
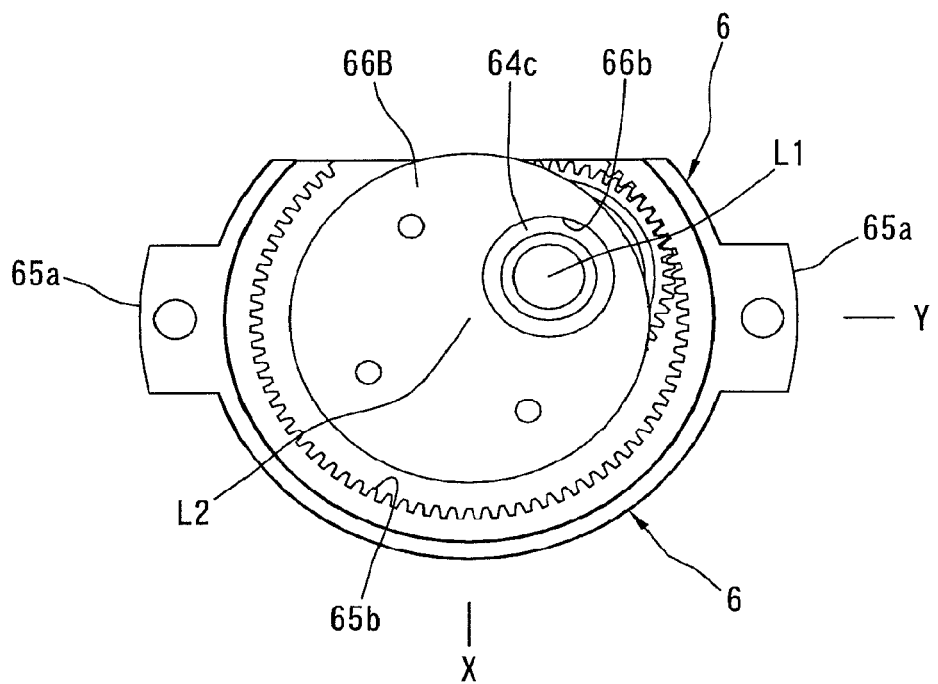
[FIG. 33] It is a plan view of the hinge assembly used in the fourth embodiment.
Figure 34:
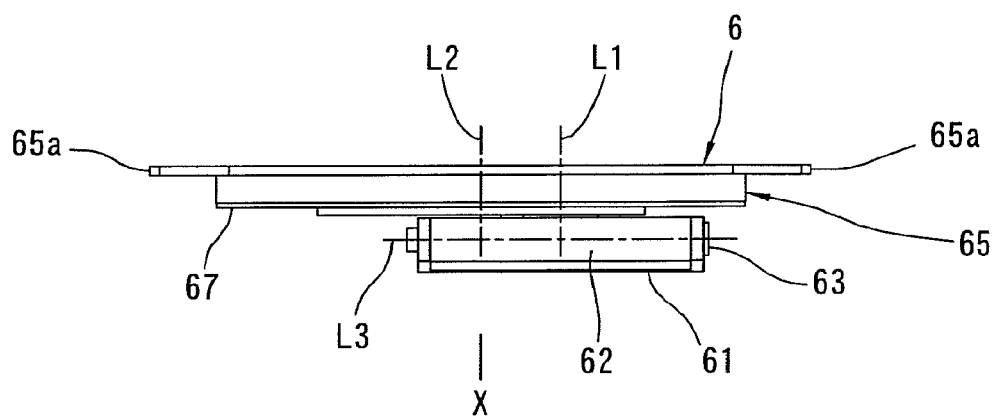
[FIG. 34] It is a view on arrow X of FIG. 33.
Figure 35:
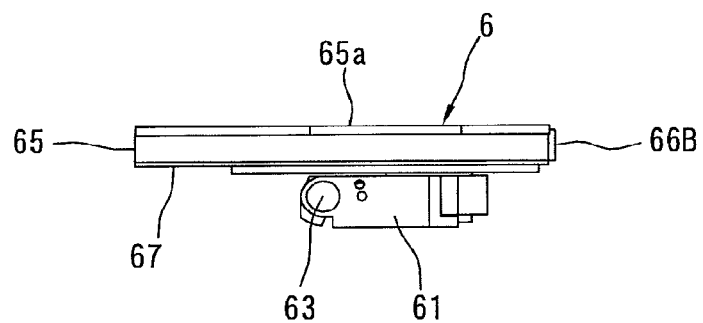
[FIG. 35] It is a view on arrow Y of FIG. 33.
Figure 36:
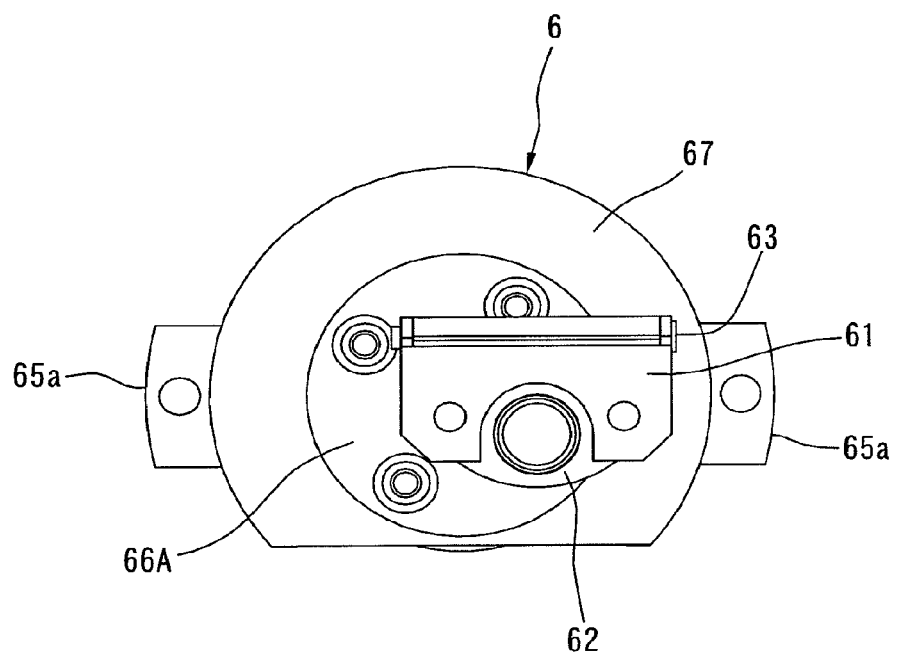
[FIG. 36] It is a view on arrow X of FIG. 34.
Figure 37:
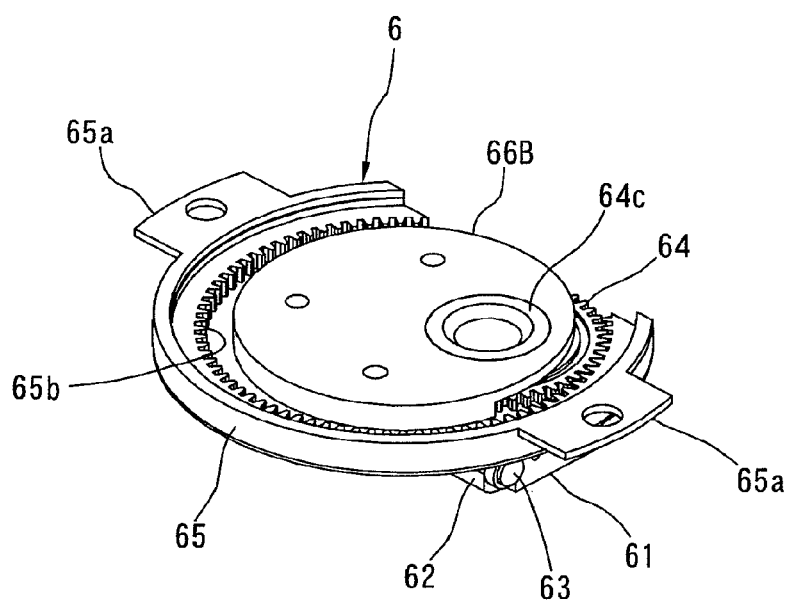
[FIG. 37] It is a perspective view of the hinge assembly used in the fourth embodiment.

Construction and arrangements of the game machine D will be described more in detail. As shown in FIG. 32, a receiving recess 1o is formed in the top surface 1a of the first housing 1. The receiving recess 1o is located near the side surface 1c. The second housing 2 is composed of a lower housing part 2A and an upper housing part 2B that are fixed to each other by fixing means (not shown) such as bolts. A receiving hole 2h is formed in a top surface of the lower housing part 2A. A distance between a center of the receiving hole 2h and the side surface 2c is smaller than a radius of the receiving hole 2h. As a result, one side portion of the receiving hole 2h is open from the side surface 2c. A through hole 2i is formed in a bottom surface of the receiving hole 2h. The through hole 2i is arranged coaxially with the receiving hole 2h. A radius of the through hole 2i is slightly smaller than the distance between the receiving hole 2h and the side surface 1c. As a result, the through hole 2i is maintained in a circular shape. Positioning recesses 2j are formed in the top surface of the lower housing part 2A. One side portion of the positioning recess 2j is open to the receiving hole 2h.

As shown in FIGS. 32 to 38, the hinge assembly 6 includes a base frame (base part) 61. The base frame 61 is received in the receiving recess 1o. An undersurface portion (first attachment portion) 61a of the base frame 61 is pressed and fixed to a bottom surface of the receiving recess 1o with fixing means (not shown) such as bolts. One side portion of a rotatable member 62 is rotatably disposed on the base frame 61 through a shaft 63. The shaft 63 extends parallel to the side surface 1c and perpendicular to the rotation axes L1, L2. An axis of the shaft 63 is the third rotation axis L3. Here, the rotatable member 62 is connected to the second housing 2 as will be described later, and rotates in unison with the second housing 2 with respect to the third rotation axis L3. Accordingly, a rotation range of the rotatable member 62 about the third rotation axis L3 is the same as the rotation range of the second housing 2, i.e. between the parallel position and the inclined position.

Figure 38:
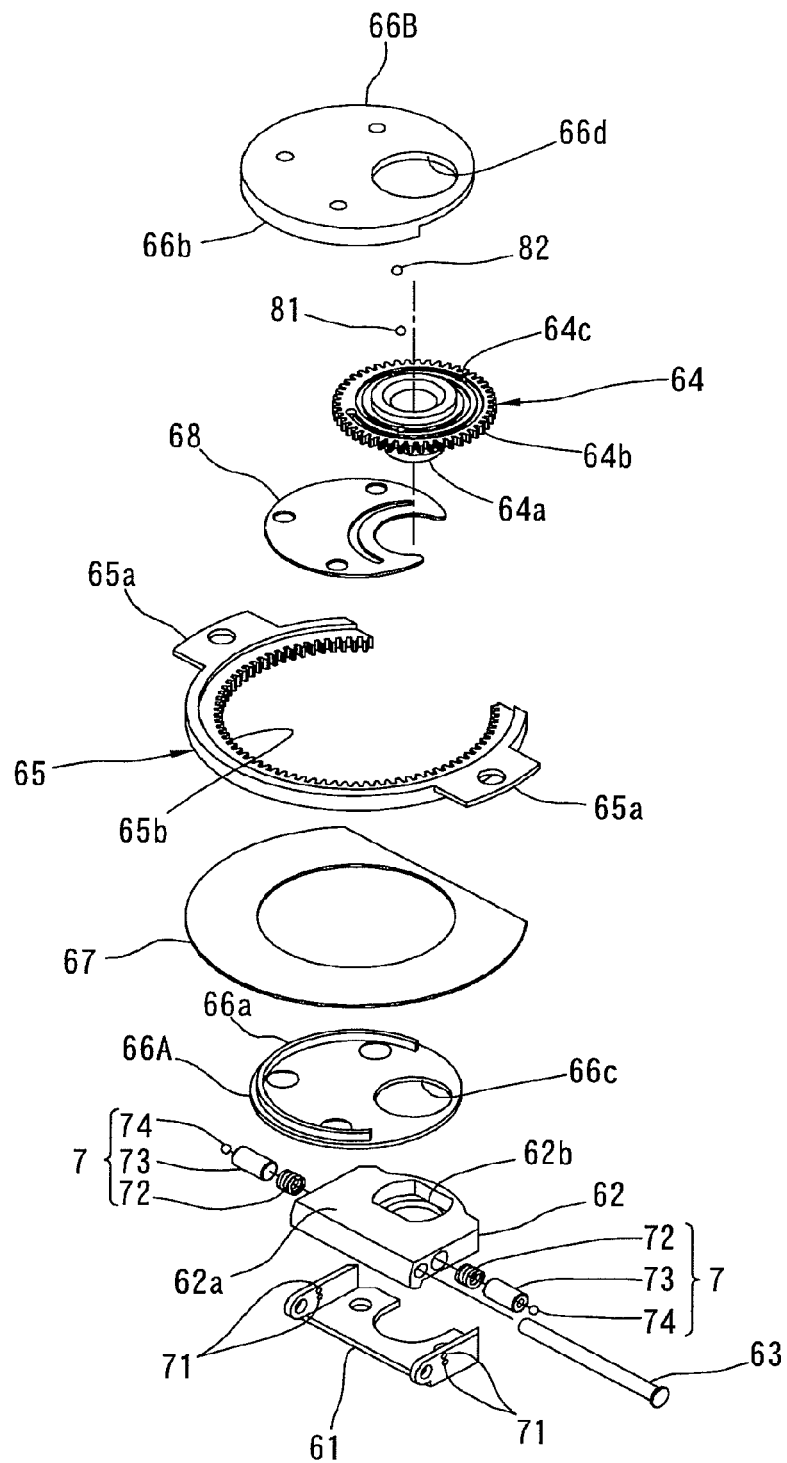
[FIG. 38] It is an exploded perspective view of the hinge assembly used in the fourth embodiment.

As shown in FIG. 38, a click mechanism 7 is provided between one end portion of the base frame 61 and one end portion of the rotatable member 62 and another click mechanism 7 is provided between the other end portion of the base frame 61 and the other end portion of the rotatable member 62. The click mechanism 7 is composed of an engagement hole 71 formed in the base frame 61 and a coiled spring 72, a push rod 73 and a spherical body 74 disposed in the rotatable member 62. The click mechanism 7 serves to provide clicking feel as the rotatable member 62 and the second housing 2 are stopped at the parallel position and the inclined position.

An attachment hole 62b is formed in the other side portion of a top surface 62a of the rotatable member 62. A lower shaft portion 64a formed in a lower end portion of a gear 64 is fitted and fixed in the attachment hole 62b. Accordingly, the gear 64 rotates about the third rotation axis L3 in unison with the roatable member 62. The gear 64 includes an external gear portion (first gear portion) 64b. The external gear portion 64b enters the receiving hole 2h through the through hole 2i. An axis of the external gear portion 64b is the first rotation axis L1. Accordingly, the gear 64 is connected to the base frame 61 such that the gear 64 is non-rotatable about the first rotation axis L1 and rotatable about the third rotation axis L3. The base frame 61, the rotatable member 62, the shaft 63 and the gear 64 constitute a first hinge member.

When the rotatable member 62 is rotated from the parallel position about the third rotation axis L3, the gear 64 fixed to the rotatable member 62 is also rotated and the first rotation axis L1 is inclined with respect to the first housing 1. In this condition, a principle that the first rotation axis L1 is fixed in position with respect to the first housing 1 is not applied. However, when the rotatable member 62 is rotated about the third rotation axis L3 and positioned in a position other than the parallel position, the rotatable member 62 (second housing 2) is not rotated about the first rotation axis L1. When the second housing 2 is rotated about the first rotation axis L1, the first rotation axis L1 is fixed in position with respect to the first housing 1.

A second hinge member 65 is fitted in the receiving hole 2h of the second housing 2. The second hinge member 65 is in a shape of letter "C" and is arranged with an open portion thereof directed to a same direction as the open portion of the receiving hole 2h. Attachment portions (second attachment portions) 65a are formed in a peripheral portion of the second hinge member 65. The attachment portions 65a are fitted in the positioning recesses 2j. The second hinge member 65 is fixed to the second housing 2 by bolts passing through the attachment portions 65a and threaded to the second housing 2.

An internal gear portion (second gear portion) 65b is formed in an inner peripheral surface of the second hinge member 65. An axis of the internal gear portion 65b is the second rotation axis L2. The internal gear portion 65b meshes with the external gear portion 64b of the gear 64. Meshing of the internal gear portion 65b with the external gear portion 64b causes the second hinge member 65 to rotate about the second rotation axis L2 and to revolve about the first rotation axis L1. As a result, the second housing 2 fixed to the second hinge member 65 rotates with respect to the first housing 1 about the first and the second rotation axes L1, L2 between the overlying position shown in FIG. 27 and the deployed position shown in FIG. 29 via the intermediate position shown in FIG. 28. The internal gear portion 65b is in the shape of letter "C". The external gear portion 64b never reaches the open portion of the internal gear portion 65b as long as the second hinge member 65 rotates between the overlying position and the deployed position. Because of this knowledge, the second hinge member 65 is formed in the shape of the letter of "C", thereby eliminating the necessity of the projecting portion 1i provided in the previous embodiments.

A short tubular portion 66a formed in a top surface of a lower support member (support member) 66A is rotatably inserted in the inner peripheral surface of the second hinge member 65 (internal gear portion 65b) with a predetermined gap. The lower support member 66A is abutted against a lower end surface of the second hinge member 65 via a reinforcement member 67. A short tubular portion (fitting portion) 66b formed in an undersurface of an upper support member (support member) 66B is rotatably fitted in the inner peripheral surface of the second hinge member 65. The short tubular portion 66a is fitted in an inner peripheral surface of the short tubular portion 66b. The lower support member 66A and the upper support member 66B are fixed to each other by fixing means (not shown) such as bolts with the lower and the upper support members 66A, 66B generally sandwiching the second hinge member 65 in the vertical direction (the direction of the first and the second rotation axes). As a result, the lower support member 66A and the upper support member 66B are connected to the second hinge member 65 such that the lower support member 66A and the upper support member 66B are rotatable about the second rotation axis L2 but non-movable in the direction of the second rotation axis L2.

A receiving space (receiving portion), not shown, is formed by the top surface of the lower support member 66A, the short tubular portion 66a and the undersurface of the upper support member 66B. The external gear portion 64b of the gear 64 is rotatably received in the receiving space. One side portion of a peripheral portion of the external gear portion 64b is protruded outside of the receiving space, and the external gear portion 64b meshes with the internal gear portion 65b at the protruded one side portion.

A through hole 66c is formed in the lower support member 66A and a through hole 66d is formed in the upper support member 66B. The lower shaft portion 64a and an upper shaft portion 64c of the gear 64 are rotatably fitted in the through holes 66c, 66d, respectively. As a result, the gear 64 is rotatably supported by the upper and the lower support members 66A, 66B and the external gear portion 64b and the internal gear portion 65b are maintained in constant mesh with each other. Moreover, the gear 64 and the second hinge member 65 are inseparably connected via the support members 66A, 66B, thereby unitizing the hinge assembly 6.

A plate spring 68 is provided between the lower support member 66A and the external gear portion 64b. The plate spring 68 biases the lower support member 66A and the upper support member 66B downward and biases the gear 64 upward. A click mechanism 8 is provided between a top surface of the external gear portion 64b and an undersurface of the upper support member 66B. In addition to the plate spring 68, the click mechanism 8 also includes two spherical bodies 81, 82 provided on the undersurface of the upper support member 66B and a guide groove 83 and four engagement recesses 84, 85, 86, 87 formed in the top surface of the external gear portion 64b.

The plate spring 68 may be provided between the upper support member 66B and the external gear portion 64b. In this case, the click mechanism 8 should be provided between an undersurface of the external gear portion 64b and the top surface of the lower support member 66A. The two spherical bodies 81, 82 may be provided on the external gear portion 64b and the guide groove 83 and the engagement recesses 84, 85, 86, 87 may be formed in the undersurface of the upper support member 66B.

Figure 39:
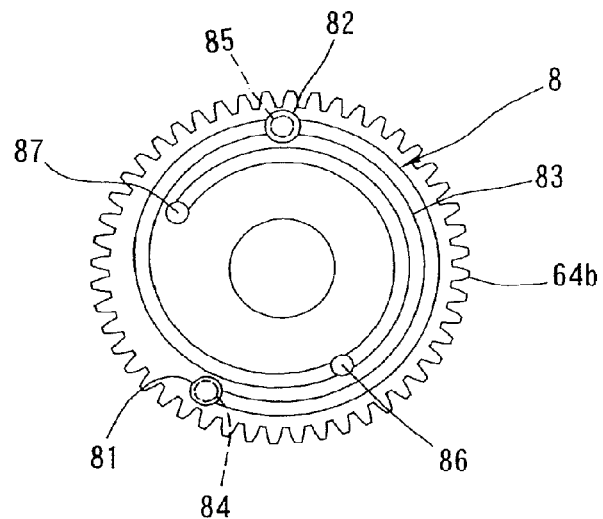
[FIG. 39] It is a plan view of a click mechanism of the hinge assembly used in the fourth embodiment when the second housing is in the overlying position.
Figure 40:
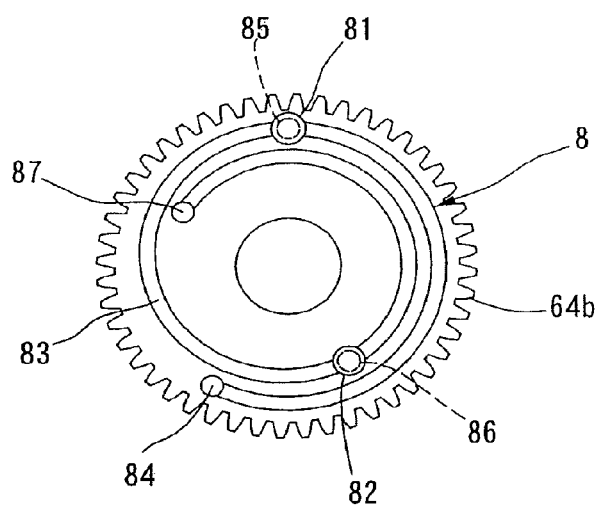
[FIG. 40] It is similar to FIG. 39, but for a condition when the second housing is in the intermediate position.
Figure 41:
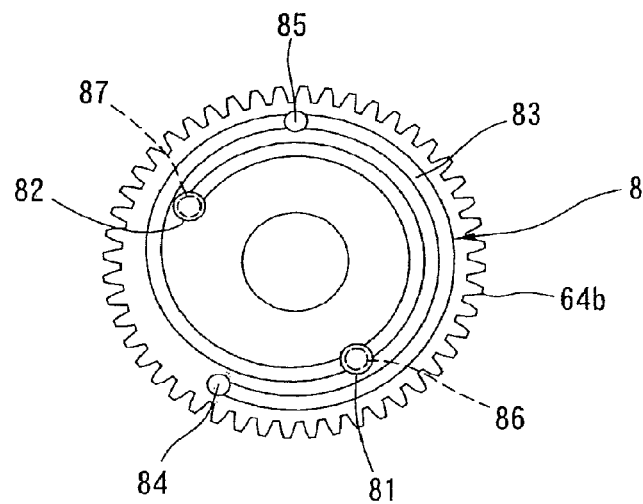
[FIG. 41] It is similar to FIG. 30, but for a condition when the second housing is in the deployed position.

Two spherical bodies 81, 82 are arranged in the undersurface of the upper support member 66B spaced from each other by a predetermined angle □ in a circumferential direction of the upper support member 66B. The angle □ is set to be equal to an angle through which the internal gear portion 65b rotates about the first rotation axis L1 when the second housing 2 rotates from the overlying position to the deployed position. The spherical bodies 81, 82 are arranged such that the spherical bodies 81, 82 are non-movable in the circumferential direction of the upper support member 66B but movable in the radial direction of the upper support member 66B. On the other hand, the guide groove 83 spirally extends about the axis of the external gear portion 64b (first rotation axis L1) as shown in FIGS. 39 to 41. An engagement recess 84 is located in one end portion of the guide groove 83, engagement recesses 85, 86 are located in an intermediate portion of the guide groove 83 in this order, and an engagement recess 87 is located in the other end portion of the guide groove 83. The engagement recesses 84, 85, 86, 87 are arranged such that: when the second housing 2 is in the overlying position, the spherical bodies 81, 82 respectively fit in the engagement recesses 84, 85 as shown in FIG. 39; when the second housing 2 is in the intermediate position, the spherical bodies 81, 82 respectively fit in the engagement recesses 85, 86 as shown in FIG. 40; and when the second housing 2 is in the deployed position, the spherical bodies 81, 82 respectively fit in the engagement recesses 86, 87 as shown in FIG. 41. In this way, the second housing 2 is fixed in position with respect to the first housing 1 with clicking feel by the biasing force of the plate spring 68 whether the second housing 2 is in the overlying position, the intermediate position or the deployed position.

Figure 42:
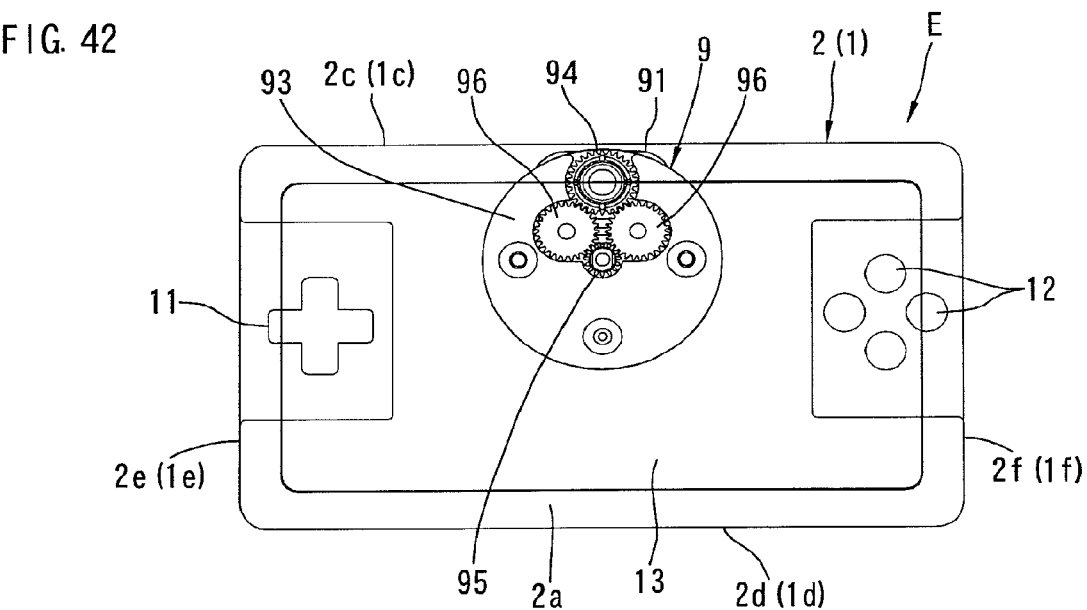
[FIG. 42] It is a partially transparent plan view of the portable device according to a fifth embodiment of the present embodiment when the second housing is in the overlying position.
Figure 43:
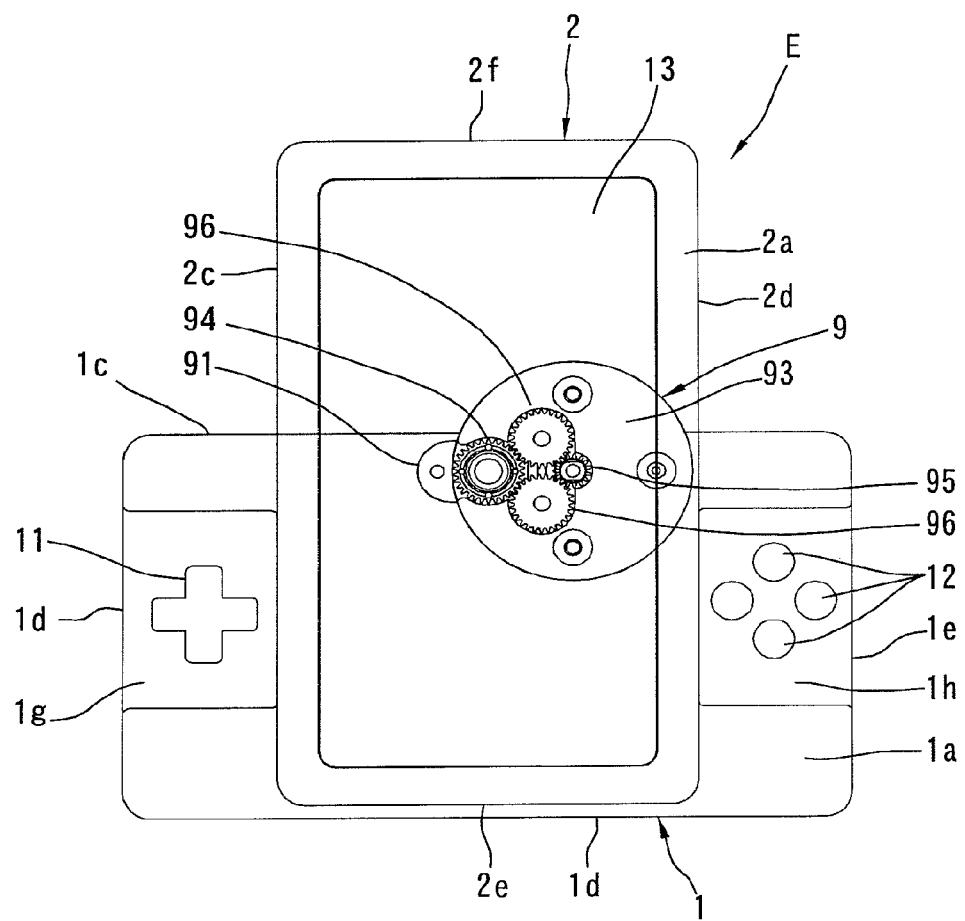
[FIG. 43] It is similar to FIG. 42, but for a condition when the second housing is in the intermediate position.
Figure 44:
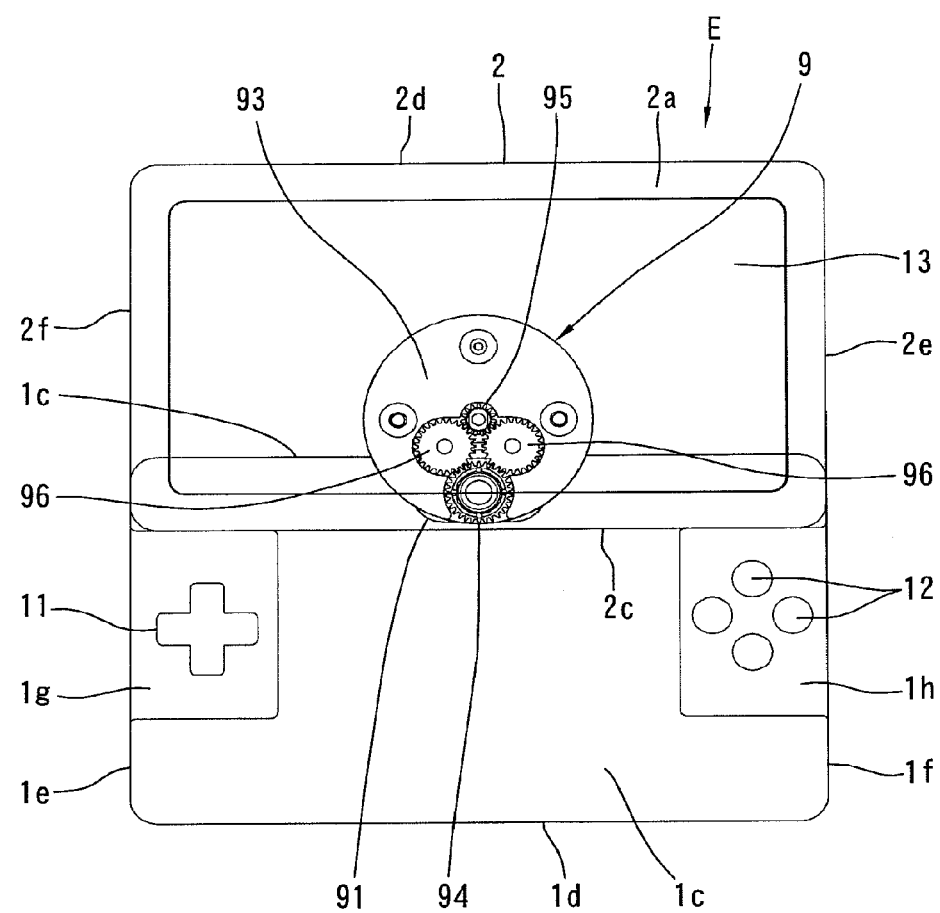
[FIG. 44] It is similar to FIG. 42, but for a condition when the second housing is in the deployed position.
Figure 45:
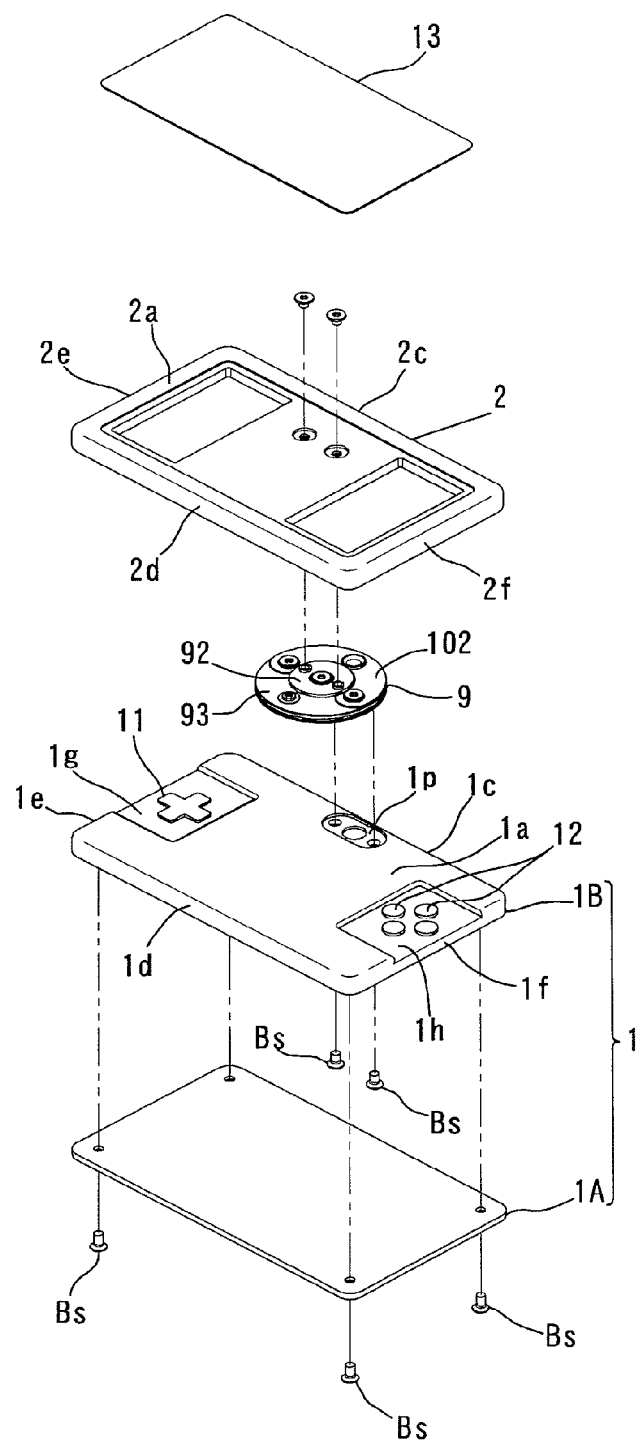
[FIG. 45] It is an exploded perspective view of the portable device according to the fifth embodiment.
Figure 46:
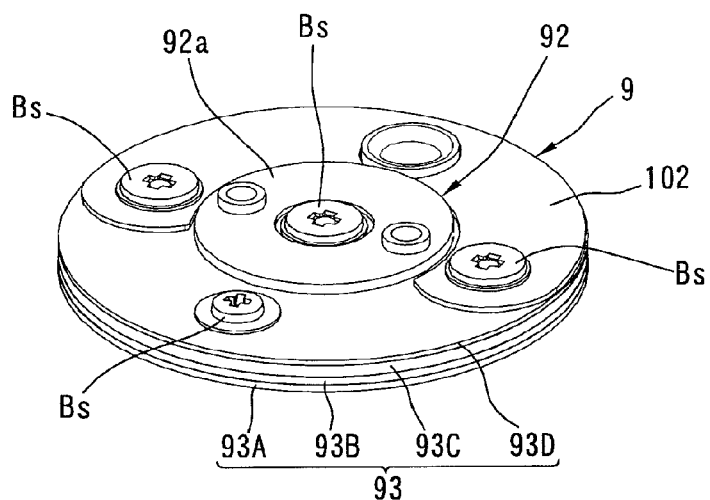
[FIG. 46] It is a perspective view of the hinge assembly used in the fifth embodiment.
Figure 47:
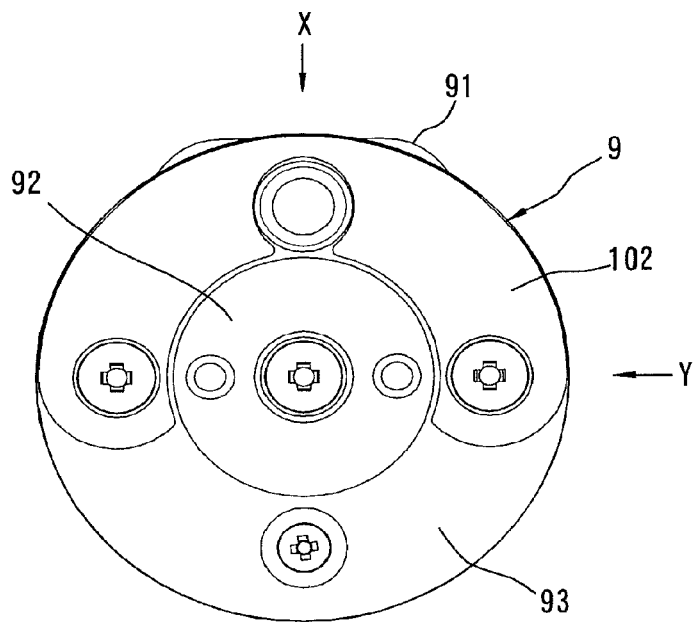
[FIG. 47] It is a plan view of the hinge assembly used in the fifth embodiment.
Figure 48:
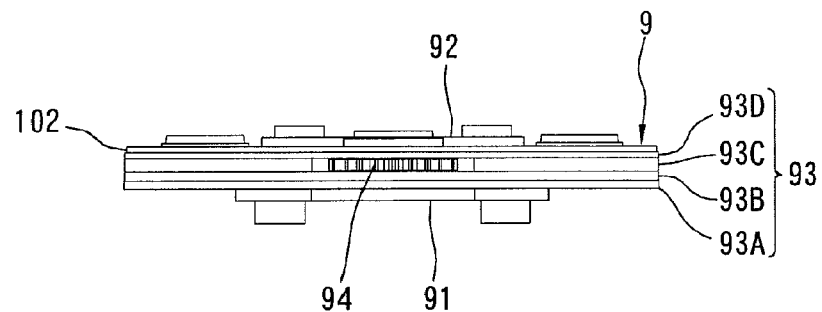
[FIG. 48] It is a view on arrow X of FIG. 47.
Figure 49:
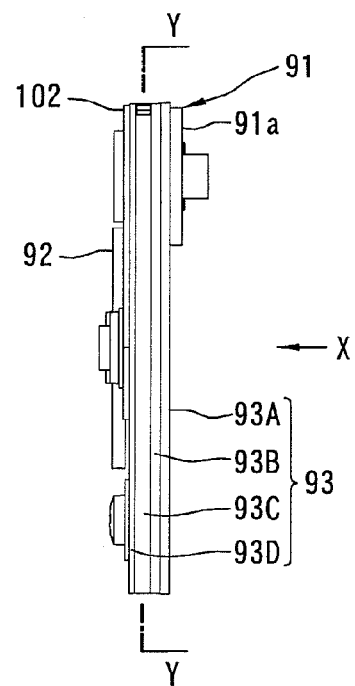
[FIG. 49] It is a view on arrow Y of FIG. 47.
Figure 50:
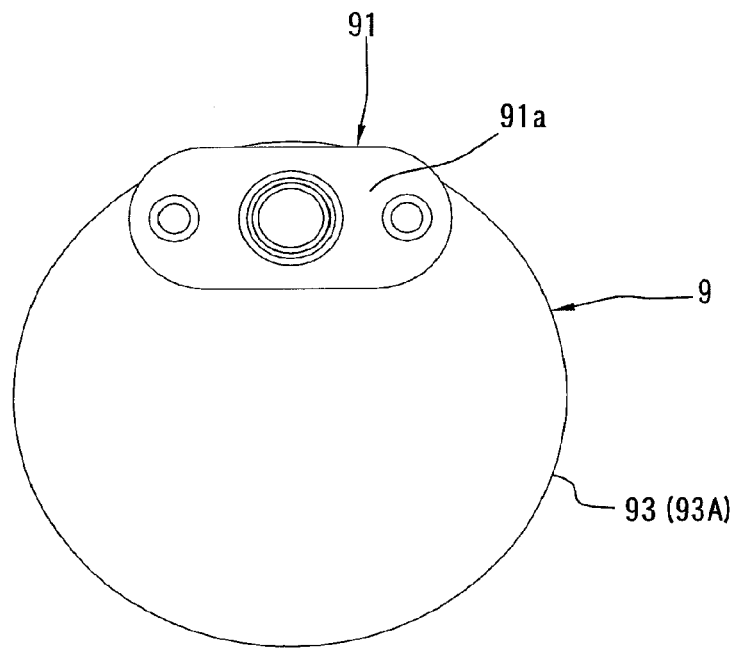
[FIG. 50] It is a view on arrow X of FIG. 49.
Figure 51:
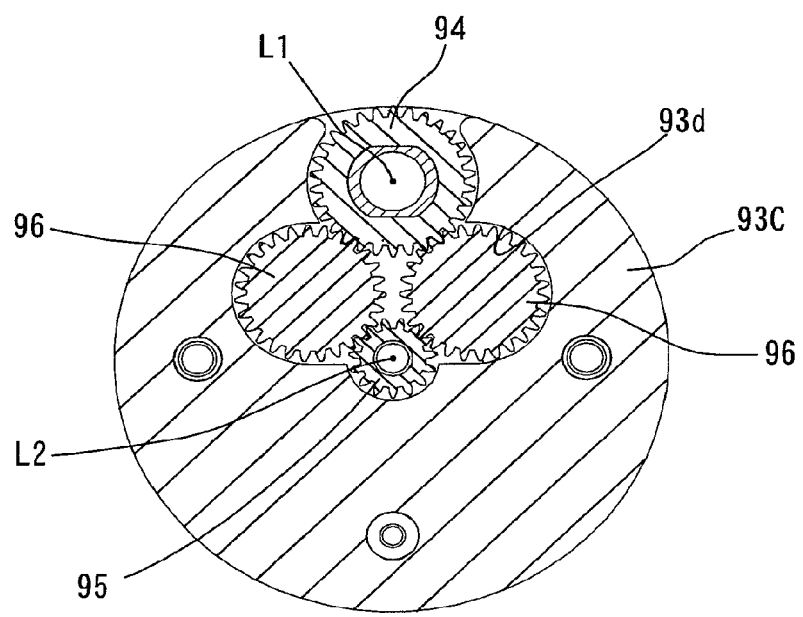
[FIG. 51] It is a cross-sectional view taken on line Y-Y of FIG. 49.
Figure 52:
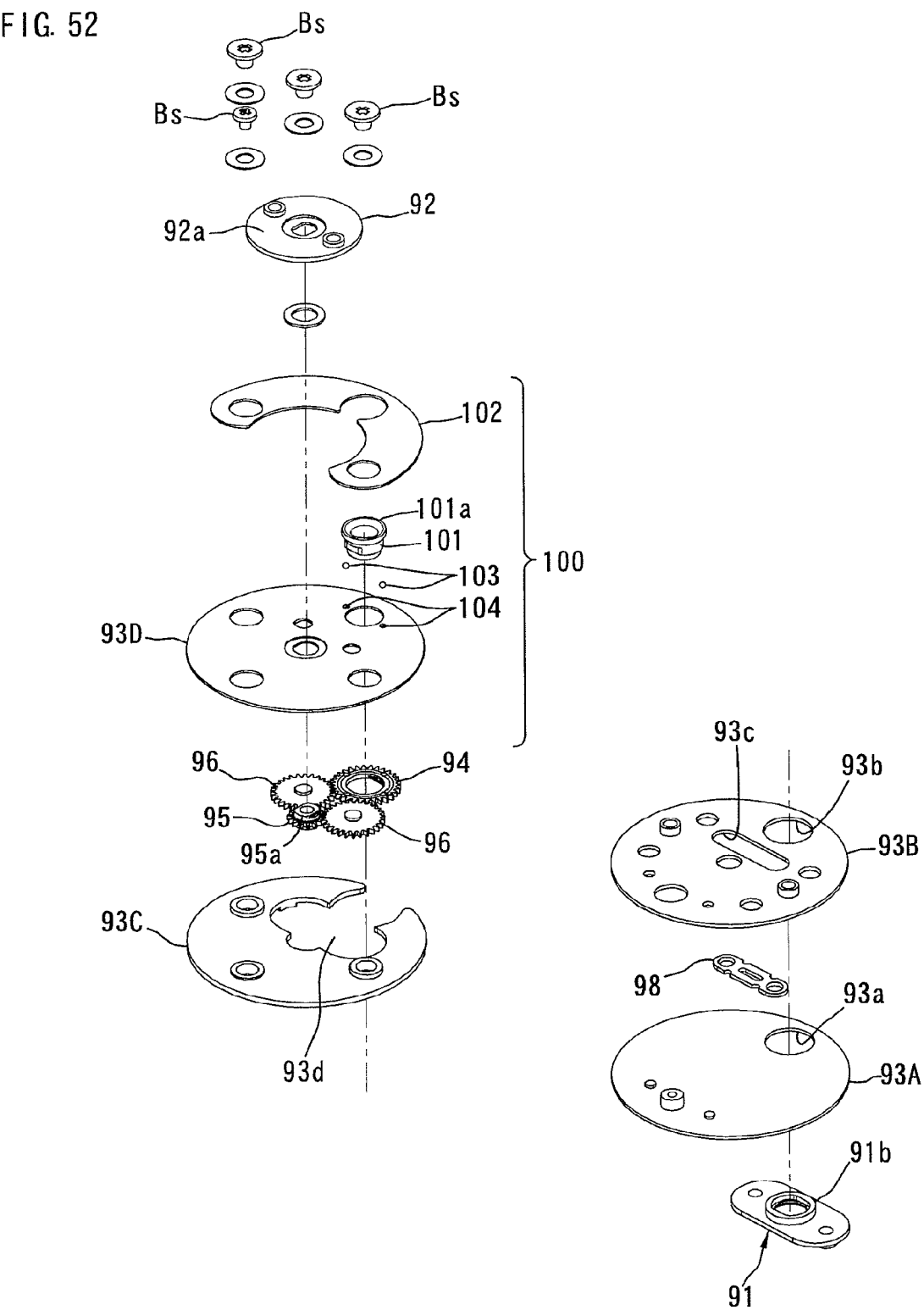
[FIG. 52] It is an exploded perspective view of the hinge assembly used in the fifth embodiment.

FIGS. 42 to 52 show a fifth embodiment of the portable device according to the present invention. As shown in FIGS. 42 to 44, in a game machine (portable device) E of the fifth embodiment, the second housing 2 is rotatable with respect to the first housing 1 between the overlying position and the deployed position via the intermediate position. The game machine E shares this feature with the game machines A to C described above. What is unique about the game machine E is that the first housing 1 is composed of a lower housing part 1A and an upper housing part 1B. The lower housing part 1A and the upper housing part 1B are fixed to each other by fixing means such as screws Bs. An attachment recess 1p is formed in a top surface (the top surface of the first housing 1) 1a of the upper housing 1B. The attachment recess 1p has an oval shape and is located in a central portion of the top surface 1a in a longitudinal direction. The attachment recess 1p is located near the side surface 1c and arranged parallel to the side surface 1c. A hinge assembly 9 is attached in the attachment recess 1p. Through the hinge assembly 9, the second housing 2 is connected to the first housing 1 such that the second housing 2 is rotatable between the overlying position and the deployed position.

As shown in FIGS. 46 to 52, the hinge assembly 9 includes a first hinge member 91, a second hinge member 92, a support member 93, a first and a second external gear portions 94, 95, a pair of idler gears 96, 96 and a click mechanism 100.

The first hinge member 91 is composed of a flat plate having an oval shape in plan view. Most of the first hinge member 91 located below and except a portion on an upper end side of the first hinge member 91 is fitted in the attachment recess 1p and fixed to the first housing 1 by fixing means such as screws Bs. As is obvious from this, a lower portion 91a of the first hinge member 91 fitted in the attachment recess 1p serves as a first attachment portion. A connecting tubular portion 91b is formed in a central portion of a top surface of the first hinge member 91. An axis of the connecting tubular portion 91b is the first rotation axis L1.

The support member 93 is composed of four, i.e., a first to a fourth support plates 93A, 93B, 93C, 93D. The first to the fourth support plates 93A, 93B, 93C, 93D are composed of thin discs having the same outer diameter. The first to the fourth support plates 93A, 93B, 93C, 93D are coaxially superposed and fixed to each other by fixing means such as screws Bs. The axis of the support member 93 is the second rotation axis L2. The second rotation axis L2 is spaced from the first rotation axis L1 in a radial direction of the support member 93 by a predetermined distance.

Connecting holes 93a, 93b are respectively formed in the first and the second support plates 93A, 93B. The connecting holes 93a, 93b are arranged coaxially with the first rotation axis L1. The connecting tubular portion 91b of the first hinge member 91 is rotatably fixed in the connecting holes 93a, 93b. In this way, the support member 93 is connected to the first hinge member 91 such that the support member 93 is rotatable about the first rotation axis L1.

A spring receiving hole 93c having an oval configuration is formed in the second support plate 93B. The spring receiving hole 93c is located between the first rotation axis L1 and the second rotation axis L2. The spring receiving hole 93c is directed such that a longitudinal direction thereof is perpendicular to a line connecting the first and the second rotation axes L1, L2. A spring member 98, to be described later, is received in the spring receiving hole 93c.

A gear receiving hole 93d is formed in the third support plate 93C. The gear receiving hole 93d is arranged such that the first and the second rotation axes L1, L2 pass through the gear receiving hole 93d. One side portion of the gear receiving hole 93d on the first rotation axis L1 side is open to outside from an outer peripheral surface of the third support plate 93C. This feature is adopted to reduce the outer diameter of the third support plate 93C, and by extension, the outer diameter of the support member 93 as much as possible. Therefore, when the reduction in diameter of the support member 93 is not important, it is not required to make the one side portion of the gear receiving hole 93d open to outside.

The first and the second gear portions 94, 95 and the pair of the idler gears 96, 96 are rotatably received in the gear receiving hole 93d.

The first external gear portion 94 is arranged coaxially with the first rotation axis L1. The first external gear portion 94 is non-rotatably connected to the first hinge member 91 via a fixing shaft 101 to be described later. Accordingly, the first external gear portion 94 relatively rotates with respect to the support member 93 about the first rotation axis L1.

The second external gear portion 95 is arranged coaxially with the second rotation axis L2. The second external gear portion 95 is rotatably supported by the second and the fourth support plates 93B, 93D. As a result, the second external gear portion 95 is connected to the first external gear portion 94 via the support member 93 such that the second external gear portion 95 can revolve about the first rotation axis L1.

The pair of the idler gears 96, 96 are arranged such that axes of the idler gears 96, 96 are parallel to the first and the second rotation axes L1, L2. The idler gears 96, 96 are arranged on opposite sides of a line perpendicular to the axes of the first and the second external gear portions 94, 95 (the first and the second rotation axes L1, L2). Each of the idler gears 96, 96 is in mesh with both of the first and the second external gear portions 94, 95.

The pair of the idler gears 96, 96 are supported by the second and the fourth support plates 93B, 93D such that the idler gears 96, 96 are movable through a very small distance in a direction to increase or decrease the distance between each other. At the same time, the idler gears 96, 96 are biased by the spring member 98 mentioned above in a direction to reduce the distance between the idler gears 96, 96. As a result, each of the idler gears 96, 96 is in mesh with the first and the second external gear portions 94, 95 without backlash.

A connecting projection 95a is formed in a central portion of a top surface of the second external gear portion 95. An upper end portion of the connecting projection 95a rotatably passes through the fourth support plate 93D and is protruded upward from the fourth support plate 93D. A central portion of the second hinge member 92 coaxial with the second rotation axis L2 is fixed to the upper end portion of the connecting projection 95a. A top surface portion 92a of the second hinge member 92 serves as a second attachment portion. The top surface portion 92a is fixed to the undersurface of the second housing 2. In this way, the second housing 2 is rotatably connected to the first housing 1 via the hinge assembly 9.

The click mechanism 100 includes the fixing shaft 101, a plate spring 102 as biasing means, a pair of spherical bodies 103, 103 and the first external gear portion 94. The fixing shaft 101 passes through the support member 93 such that the fixing shaft 101 is rotatable and movable in the direction of the first rotation axis L1 and through the first external gear portion 94 such that the fixing shaft 101 is non-rotatable and movable in the direction of the first rotation axis L1. A lower end portion of the fixing shaft 101 is fitted and fixed in an inner periphery of the connecting tubular portion 91b of the first hinge member 91. An upper end portion of the fixing shaft 101 is protruded upward from a top surface of the support member 93 (the fourth support plate 93D). An annular protrusion portion 101a is formed in the upper end portion of the fixing shaft 101. The annular protrusion portion 101a is in slidable contact with the top surface of the support member 93. Thanks to this arrangement, the support member 93 is inescapably connected to the first hinge member 91, thereby unitizing the hinge assembly 9.

A pair of through holes 104, 104 extending parallel to the first rotation axis L1 are formed in the fourth support plate 93D. The pair of the through holes 104, 104 are arranged on a circle about the first rotation axis L1 spaced from each other by 180 degrees in the circumferential direction. An inner diameter of the through hole 104 is greater than a thickness of the fourth support plate 93D by a predetermined amount. The spherical bodies 103 are respectively inserted in the through holes 104 such that each of the spherical bodies 103 is rotatable and movable in an axial direction of the through hole 104. An outer diameter of the spherical body 103 is generally the same as the inner diameter of the through hole 104. Accordingly, one side portion and the other side portion of the outer peripheral surface of the spherical body 103 in the direction of the first rotation axis L1 are protruded outside of the through hole 104. The one side portion of the spherical body 103 protruded from the through hole 104 to the top surface side of the fourth support plate 93D is biased downward by the plate spring 102 fixed to the top surface of the fourth support plate 93D. The other side portion of the spherical body 103 protruded from the through hole 104 to the undersurface side of the fourth support plate 93D is pressed onto a top surface of the first external gear portion 94 by the biasing force of the plate spring 102.

Four engagement recesses (not shown) are formed in the top surface of the first external gear portion 94. The engagement recesses are arranged on a circle about the first rotation axis L1 spaced from each other by 90 degrees. The circle coincides with the circle on which the spherical bodies 103 are arranged. The four engagement recesses are arranged such that the spherical bodies 103, 103 respectively enter two of the engagement recesses when the second housing 2 is in the overlying position, the intermediate position or the deployed position. Thanks to this arrangement, the second housing 2 is stopped at the overlying position, the intermediate position and the deployed position with clicking feel.

In the game machine E having the construction and arrangements described above, a rattle caused by a backlash between the first and the second external gear portions 94, 95 does not occur since the idler gears 96 are in mesh with the first and the second external gear portions 94, 95 without backlash. Therefore, a rattle does not occur between the first and the second housings 1, 2.

A rattle caused by a backlash between the first and the second external gear portions 94, 95 can be avoided by arranging either one of the first and the second external gear portions 94, 95 in such a manner as to be movable in the direction to increase or decrease the distance between the first and the second external gear portions 94, 95 and biasing the said one of the first and the second external gear portions 94, 95 toward the other by biasing means. However, in this case, the first external gear portion 94 or the second external gear portion 95 is moved. It results in an undesirable condition in which the first rotation axis L1 is moved with respect to the first housing 1 or the second rotation axis L2 is moved with respect to the second housing 2. Therefore, it is not a realistic solution.

The present invention is not limited to the above described embodiments and various modifications are possible within the scope of the present invention.

For example, although in the embodiments given above, the first and the second housings 1, 2 are the same in shape and dimensions in plan view, the first and the second housings 1, 2 may be different in shape and dimensions. For example, the first housing 1 may have a trapezoidal shape. Even in such a case, it is desirable that the opposite ends of the first housing 1, the opposite ends having the operation button 11 and the push buttons 12 disposed thereon, should be protruded from the second housing 2 to the left and to the right when the second housing 2 is in the intermediate position.

Also, in the embodiments given above, the top surface 1a of the first housing 1 and the undersurface 2b of the second housing 2 are parallel, and the first and the second housings 1, 2 are arranged such that the top surface 1a and the undersurface 2b are in general contact with each other, and thereby making the first and the second housings 1, 2 generally overlap each other. Alternatively, the first and the second housings 1, 2 may be arranged such that only a portion of the top surface 1a and only a portion of the undersurface 2b are in general contact with each other, thereby making only portions of the first and the second housings 1, 2 generally overlap each other.

INDUSTRIAL APPLICABILITY

A portable device according to the present invention may be used as a mobile phone handset or a portable game machine. A hinge assembly according to the present invention may be used for rotatably connecting a first housing and a second housing of a portable device.

The invention claimed is:
1. A portable device comprising:
a first housing;
a second housing; and
a hinge assembly rotatably connecting said first housing and said second housing, wherein
said second housing is connected to said first housing by said hinge assembly such that said second housing can revolve with respect to said first housing about a first rotation axis,
said first rotation axis is fixed in position with respect to said first housing,
said second housing can rotate about a second rotation axis, said second rotation axis fixed in position with respect to said second housing and extending parallel to said first rotation axis,
at least a portion of said first housing and a portion of said second housing is arranged such that said portion of said first housing and said portion of said second housing are in general contact with each other or spaced from each other in a direction of said first rotation axis and said second rotation axis so that at least said portion of said first housing and said portion of said second housing overlap each other in said direction of said first rotation axis and said second rotation axis, and
said first rotation axis and said second rotation axis are arranged such that longitudinal directions of said first rotation axis and said second rotation axis are oriented in a direction in which said first housing and said second housing overlap each other.
2. The portable device according to claim 1 wherein said hinge assembly comprises a connecting member, one end portion of said connecting member being connected to said first housing such that said connecting member is rotatable about said first rotation axis, the other end portion of said connecting member being connected to said second housing such that said connecting member is rotatable about said second rotation axis.

3. The portable device according to claim 2 wherein
a receiving recess is formed in one of said portion of said first housing and said portion of said second housing overlapping each other in said direction of said first rotation axis and said second rotation axis,
one side portion of said receiving recess in a direction perpendicular to said first rotation axis and said second rotation axis being open, said one end portion of said connecting member being received in said receiving recess such that said connecting member is rotatable about said first rotation axis, and
said the other end portion of said connecting member being received in said receiving recess such that said the other end portion of said connecting member is movable in and out of said one side portion of said receiving recess that is open.

4. The portable device according to claim 2 wherein
a first receiving recess and a second receiving recess are respectively formed in said portion of said first housing and said portion of said second housing overlapping each other in said direction of said first rotation axis and said second rotation axis,
one side portion of said first receiving recess in a direction perpendicular to said first rotation axis and said second rotation axis being open,
one side portion of said second receiving recess in said direction perpendicular to said first rotation axis and said second rotation axis being open,
said first receiving recess being able to receive said one side portion of said connecting member in said direction of said first rotation axis and said second rotation axis,
said second receiving recess being able to receive said the other side portion of said connecting member in said direction of said first rotation axis and said second rotation axis,
said one end portion of said connecting member being received in said first receiving recess such that said connecting member is rotatable about said first rotation axis,
said the other end portion of said connecting member being received in said first receiving recess such that said the other end portion of said connecting member is movable in and out of said one side portion of said first receiving recess that is open,
said the other end portion of said connecting member being received in said second receiving recess such that said connecting member is rotatable about said second rotation axis,
said one end portion of said connecting member being received in said second receiving recess such that said one end portion of said connecting member is movable in and out of said one side portion of said second receiving recess that is open.

5. The portable device according to claim 1 wherein
said hinge assembly comprises a first gear portion and a second gear portion,
said first gear portion non-rotatably disposed in said first housing such that an axis of said first gear portion coincides with said first rotation axis,
said second gear portion non-rotatably disposed in said second housing such that an axis of said second gear portion coincides with said second rotation axis,
said second gear portion meshing with said first gear portion.

6. The portable device according to claim 5 wherein
said hinge assembly further comprises a support member,
said support member being connected to said first gear portion such that said support member is rotatable about said first rotation axis,
said support member being connected to said second gear portion such that said support member is rotatable about said second rotation axis,
said support member being rotatable with respect to said first housing about said first rotation axis,
said support member being rotatable with respect to said second housing about said second rotation axis.

7. The portable device according to claim 6 wherein
one of said first gear portion and said second gear portion is an internal gear portion and the other of said first gear portion and said second gear portion is an external gear portion,
a fitting portion being provided in said support member,
said fitting portion fitted to an inner peripheral surface of said internal gear portion such that said fitting portion is rotatable about an axis of said internal gear portion,
a receiving portion being provided in said fitting portion,
said receiving portion receiving said external gear portion such that said external gear portion is rotatable about said second rotation axis,
one side portion of said receiving portion being open to outside of an outer peripheral surface of said fitting portion,
one side portion of said external gear portion being protruded outside of said one side portion of said receiving portion that is open,
said external gear portion being in mesh with said internal gear portion at said one side portion of said external gear portion that is protruded outside.

8. The portable device according to claim 1 wherein
when said second housing is rotated with respect to said first housing about said first rotation axis and said second rotation axis to a predetermined rotational position,
said second housing is rotatable with respect to said first housing about a third rotation axis extending in a direction perpendicular to said first rotation axis and said second rotation axis.

9. A hinge assembly comprising:
a first hinge member having a first attachment portion and a first gear portion;
a second hinge member having a second attachment portion and a second gear portion, said second gear portion being in mesh with said first gear portion; and
a support member, said support member supporting said first hinge member such that said first hinge member is rotatable about an axis of said first gear portion,
said support member supporting said second hinge member such that said second hinge member is rotatable about an axis of said second gear portion,
said support member maintaining said first gear portion and said second gear portion in mesh with each other,
said axis of said first gear portion and said axis of said second gear portion being parallel with each other, and
said first gear portion is an internal gear portion and said second gear portion is an external gear portion, wherein
a fitting portion is provided in said support member,
said fitting portion rotatably fitted in an inner peripheral surface of said first gear portion,
a receiving portion being provided in said fitting portion,
said receiving portion rotatably receiving said second gear portion, one side portion of said receiving portion being open to outside of an outer peripheral surface of said fitting portion, one side portion of said second gear portion being protruded outside of said one side portion of said receiving portion that is open, said second gear portion being in mesh with said first gear portion at said one side portion of said second gear portion that is protruded outside.

10. A hinge assembly comprising:

a first hinge member having a first attachment portion and a first gear portion;

a second hinge member having a second attachment portion and a second gear portion, said second gear portion being in mesh with said first gear portion; and a support member, said support member supporting said first hinge member such that said first hinge member is rotatable about an axis of said first gear portion, said support member supporting said second hinge member such that said second hinge member is rotatable about an axis of said second gear portion, said support member maintaining said first gear portion and said second gear portion in mesh with each other, said axis of said first gear portion and said axis of said second gear portion being parallel with each other, and said first gear portion is an internal gear portion and said second gear portion is an external gear portion, wherein said first hinge member comprises a base part and a rotatable member, said base part having said first attachment portion disposed thereon, said rotatable member having said first gear portion disposed thereon, said rotatable member being connected to said base part such that said rotatable member is rotatable about an axis extending in a direction perpendicular to said axis of said first gear portion.

11. The portable device according to claim 2 wherein when said second housing is rotated with respect to said first housing about said first rotation axis and said second rotation axis to a predetermined rotational position, said second housing is rotatable with respect to said first housing about a third rotation axis extending in a direction perpendicular to said first rotation axis and said second rotation axis.

12. The portable device according to claim 3 wherein when said second housing is rotated with respect to said first housing about said first rotation axis and said second rotation axis to a predetermined rotational position, said second housing is rotatable with respect to said first housing about a third rotation axis extending in a direction perpendicular to said first rotation axis and said second rotation axis.

13. The portable device according to claim 4 wherein when said second housing is rotated with respect to said first housing about said first rotation axis and said second rotation axis to a predetermined rotational position, said second housing is rotatable with respect to said first housing about a third rotation axis extending in a direction perpendicular to said first rotation axis and said second rotation axis.

14. The portable device according to claim 5 wherein when said second housing is rotated with respect to said first housing about said first rotation axis and said second rotation axis to a predetermined rotational position, said second housing is rotatable with respect to said first housing about a third rotation axis extending in a direction perpendicular to said first rotation axis and said second rotation axis.

15. The portable device according to claim 6 wherein when said second housing is rotated with respect to said first housing about said first rotation axis and said second rotation axis to a predetermined rotational position, said second housing is rotatable with respect to said first housing about a third rotation axis extending in a direction perpendicular to said first rotation axis and said second rotation axis.

16. The portable device according to claim 7 wherein when said second housing is rotated with respect to said first housing about said first rotation axis and said second rotation axis to a predetermined rotational position, said second housing is rotatable with respect to said first housing about a third rotation axis extending in a direction perpendicular to said first rotation axis and said second rotation axis.

17. The hinge assembly according to claim 9 wherein said first hinge member comprises a base part and a rotatable member, said base part having said first attachment portion disposed thereon, said rotatable member having said first gear portion disposed thereon, said rotatable member being connected to said base part such that said rotatable member is rotatable about an axis extending in a direction perpendicular to said axis of said first gear portion.

* * * * *